United States Patent
Siddiquee et al.

(10) Patent No.: US 12,437,023 B2
(45) Date of Patent: *Oct. 7, 2025

(54) SYSTEMS AND METHODS FOR MULTI-SYSTEM NETWORKING AND CONTENT DELIVERY USING TAXONOMY SCHEMES

(71) Applicant: SDL Netherlands B.V., Amsterdam (NL)

(72) Inventors: Likhan Siddiquee, Utrecht (NL); Ivo van de Lagemaat, North Holland (NL); Rick Pannekoek, Amsterdam (NL); Dave De Meyer, Mechelen (BE); Ben Middleton, Bristol (GB)

(73) Assignee: SDL Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,654

(22) Filed: Oct. 22, 2021

(65) Prior Publication Data
US 2022/0043868 A1 Feb. 10, 2022

Related U.S. Application Data

(63) Continuation of application No. 16/169,901, filed on Oct. 24, 2018, now Pat. No. 11,182,455, which is a
(Continued)

(51) Int. Cl.
*G06F 16/958* (2019.01)
*G06F 16/83* (2019.01)
(Continued)

(52) U.S. Cl.
CPC ............ *G06F 16/958* (2019.01); *G06F 16/83* (2019.01); *G06F 40/143* (2020.01); *H04L 67/535* (2022.05)

(58) Field of Classification Search
None
See application file for complete search history.

(56) References Cited

U.S. PATENT DOCUMENTS

| 4,845,658 A | 7/1989 | Gifford |
| 4,916,614 A | 4/1990 | Kaji |
(Continued)

FOREIGN PATENT DOCUMENTS

| AU | 5240198 A | 5/1998 |
| AU | 694367 B2 | 7/1998 |
(Continued)

OTHER PUBLICATIONS

"Oracle ATG Web Commerce—Introduction." Published in 2013 by Oracle Corporation. Accessed Jan. 19, 2021 from https://docs.oracle.com/cd/E35319_01/Platform.10-2/ATGPlatformProgGuide/html/s0101introduction01.html (Year: 2013).*
(Continued)

*Primary Examiner* — Tony Mahmoudi
*Assistant Examiner* — Umar Mian
(74) *Attorney, Agent, or Firm* — Carr & Ferrell LLP

(57) ABSTRACT

Taxonomy driven multi-system networking and content delivery systems and methods are provided herein. An example systems includes a website authoring platform generating a taxonomy structure for a webpage, the taxonomy structure indicating assets to be included in the webpage a layout for the assets, a technical documentation authoring system for creating technical documents related to the assets, and a metadata binder providing the technical documentation authoring system with access to the taxonomy structure of the website authoring platform so that technical document authors are provided with the taxonomy structure to guide creation and structuring of the technical
(Continued)

documents so that the technical documents comprise data that corresponds to the assets.

20 Claims, 10 Drawing Sheets

Related U.S. Application Data continuation-in-part of application No. 13/016,989, filed on Jan. 29, 2011, now Pat. No. 10,657,540.

(51) Int. Cl.
G06F 40/143 (2020.01)
H04L 67/50 (2022.01)

(56) References Cited

U.S. PATENT DOCUMENTS

| | | | |
|---|---|---|---|
| 4,920,499 A | 4/1990 | Skeirik | |
| 5,075,850 A | 12/1991 | Asahioka et al. | |
| 5,295,068 A | 3/1994 | Nishino et al. | |
| 5,351,189 A | 9/1994 | Doi | |
| 5,418,717 A | 5/1995 | Su et al. | |
| 5,477,451 A | 12/1995 | Brown et al. | |
| 5,497,319 A | 3/1996 | Chong et al. | |
| 5,640,575 A | 6/1997 | Maruyama | |
| 5,644,775 A | 7/1997 | Thompson et al. | |
| 5,675,802 A | 10/1997 | Allen et al. | |
| 5,708,780 A | 1/1998 | Levergood et al. | |
| 5,715,314 A | 2/1998 | Payne et al. | |
| 5,724,424 A | 3/1998 | Gifford | |
| 5,751,957 A | 5/1998 | Hiroya et al. | |
| 5,774,868 A | 6/1998 | Cragun et al. | |
| 5,812,776 A | 9/1998 | Gifford | |
| 5,813,007 A | 9/1998 | Nielsen | |
| 5,873,056 A | 2/1999 | Liddy | |
| 5,884,097 A | 3/1999 | Li et al. | |
| 5,884,246 A | 3/1999 | Boucher et al. | |
| 5,894,554 A | 4/1999 | Lowery et al. | |
| 5,895,446 A | 4/1999 | Takeda et al. | |
| 5,909,492 A | 6/1999 | Payne et al. | |
| 5,966,685 A | 10/1999 | Flanagan et al. | |
| 5,974,372 A | 10/1999 | Barnes | |
| 5,978,828 A | 11/1999 | Greer et al. | |
| 5,987,401 A | 11/1999 | Trudeau | |
| 5,987,402 A | 11/1999 | Murata et al. | |
| 6,026,413 A | 2/2000 | Challenger et al. | |
| 6,041,333 A | 3/2000 | Bretschneider et al. | |
| 6,041,360 A | 3/2000 | Himmel et al. | |
| 6,044,344 A | 3/2000 | Kanevsky | |
| 6,049,785 A | 4/2000 | Gifford | |
| 6,085,162 A | 7/2000 | Cherny | |
| 6,092,035 A | 7/2000 | Kurachi et al. | |
| 6,108,703 A | 8/2000 | Leighton et al. | |
| 6,122,666 A | 9/2000 | Beurket et al. | |
| 6,128,652 A | 10/2000 | Toh et al. | |
| 6,128,655 A | 10/2000 | Fields et al. | |
| 6,161,082 A | 12/2000 | Goldberg et al. | |
| 6,163,785 A | 12/2000 | Carbonell et al. | |
| 6,195,649 B1 | 2/2001 | Gifford | |
| 6,199,051 B1 | 3/2001 | Gifford | |
| 6,205,437 B1 | 3/2001 | Gifford | |
| 6,212,634 B1 | 4/2001 | Geer et al. | |
| 6,216,212 B1 | 4/2001 | Challenger et al. | |
| 6,219,818 B1 | 4/2001 | Freivald et al. | |
| 6,256,712 B1 | 7/2001 | Challenger et al. | |
| 6,263,332 B1 | 7/2001 | Nasr et al. | |
| 6,278,969 B1 | 8/2001 | King et al. | |
| 6,279,112 B1 | 8/2001 | O'toole, Jr. et al. | |
| 6,330,566 B1 | 12/2001 | Durham | |
| 6,330,598 B1 | 12/2001 | Beckwith et al. | |
| 6,338,033 B1 | 1/2002 | Bourbonnais et al. | |
| 6,347,316 B1 | 2/2002 | Redpath | |
| 6,356,865 B1 | 3/2002 | Franz et al. | |
| 6,356,903 B1 | 3/2002 | Baxter et al. | |
| 6,363,337 B1 | 3/2002 | Amith | |
| 6,401,105 B1 | 6/2002 | Carlin et al. | |
| 6,415,257 B1 | 7/2002 | Junqua | |
| 6,438,540 B2 | 8/2002 | Nasr et al. | |
| 6,449,599 B1 | 9/2002 | Payne et al. | |
| 6,477,524 B1 | 11/2002 | Taskiran | |
| 6,477,575 B1 | 11/2002 | Koeppel et al. | |
| 6,490,358 B1 | 12/2002 | Geer et al. | |
| 6,490,563 B2 | 12/2002 | Hon | |
| 6,526,426 B1 | 2/2003 | Lakritz | |
| 6,581,061 B2 | 6/2003 | Graham | |
| 6,623,529 B1 | 9/2003 | Lakritz | |
| 6,658,627 B1 | 12/2003 | Gallup | |
| 6,725,333 B1 | 4/2004 | Degenaro et al. | |
| 6,748,569 B1 | 6/2004 | Brooke et al. | |
| 6,782,384 B2 | 8/2004 | Sloan et al. | |
| 6,865,528 B1 | 3/2005 | Huang | |
| 6,920,419 B2 | 7/2005 | Kitamura | |
| 6,973,656 B1 | 12/2005 | Huynh et al. | |
| 6,976,207 B1 | 12/2005 | Rujan | |
| 6,990,439 B2 | 1/2006 | Xun | |
| 7,013,264 B2 | 3/2006 | Dolan | |
| 7,031,908 B1 | 4/2006 | Huang | |
| 7,050,964 B2 | 5/2006 | Menzes | |
| 7,076,494 B1 | 7/2006 | Baer et al. | |
| 7,089,493 B2 | 8/2006 | Hatori et al. | |
| 7,111,229 B2 | 9/2006 | Nicholas et al. | |
| 7,124,092 B2 | 10/2006 | O'toole, Jr. et al. | |
| 7,177,792 B2 | 2/2007 | Knight | |
| 7,191,447 B1 | 3/2007 | Ellis et al. | |
| 7,207,005 B2 | 4/2007 | Laktritz | |
| 7,209,875 B2 | 4/2007 | Quirk | |
| 7,249,013 B2 | 7/2007 | Al-Onaizan | |
| 7,249,314 B2 | 7/2007 | Walker et al. | |
| 7,272,639 B1 | 9/2007 | Levergood et al. | |
| 7,295,962 B2 | 11/2007 | Marcu | |
| 7,295,963 B2 | 11/2007 | Richardson et al. | |
| 7,302,429 B1 | 11/2007 | Wanker | |
| 7,333,927 B2 | 2/2008 | Lee | |
| 7,340,388 B2 | 3/2008 | Soricut | |
| 7,353,165 B2 | 4/2008 | Zhou | |
| 7,369,984 B2 | 5/2008 | Fairweather | |
| 7,383,320 B1 | 6/2008 | Silberstein et al. | |
| 7,389,222 B1 | 6/2008 | Langmead | |
| 7,389,223 B2 | 6/2008 | Atkin | |
| 7,392,255 B1 * | 6/2008 | Sholtis | G06F 16/256 707/999.203 |
| 7,448,040 B2 | 11/2008 | Ellis et al. | |
| 7,454,326 B2 | 11/2008 | Marcu | |
| 7,464,086 B2 | 12/2008 | Black et al. | |
| 7,509,313 B2 | 3/2009 | Colledge | |
| 7,516,062 B2 | 4/2009 | Chen et al. | |
| 7,533,013 B2 | 5/2009 | Marcu | |
| 7,606,814 B2 | 10/2009 | Deily et al. | |
| 7,620,538 B2 | 11/2009 | Marcu | |
| 7,620,549 B2 | 11/2009 | Di Cristo | |
| 7,624,005 B2 | 11/2009 | Koehn | |
| 7,668,782 B1 | 2/2010 | Reistad et al. | |
| 7,680,647 B2 | 3/2010 | Moore | |
| 7,698,126 B2 | 4/2010 | Kohlmeier et al. | |
| 7,716,037 B2 | 5/2010 | Precoda | |
| 7,734,459 B2 | 6/2010 | Menezes | |
| 7,739,102 B2 | 6/2010 | Bender | |
| 7,739,286 B2 | 6/2010 | Sethy | |
| 7,788,087 B2 | 8/2010 | Corston-Oliver | |
| 7,813,918 B2 | 10/2010 | Muslea | |
| 7,836,057 B1 | 11/2010 | Micaelian et al. | |
| 7,836,110 B1 | 11/2010 | Schoenbach et al. | |
| 7,865,358 B2 | 1/2011 | Green | |
| 7,904,595 B2 | 3/2011 | Cheng et al. | |
| 7,925,493 B2 | 4/2011 | Watanabe | |
| 7,945,437 B2 | 5/2011 | Mount et al. | |
| 7,949,633 B1 | 5/2011 | Shaver et al. | |
| 7,958,453 B1 | 6/2011 | Taing | |
| 7,975,255 B2 | 7/2011 | Kosov et al. | |
| 7,983,896 B2 | 7/2011 | Ross | |
| 7,983,897 B2 | 7/2011 | Chin | |
| 8,015,222 B2 | 9/2011 | Abnous et al. | |
| 8,036,929 B1 | 10/2011 | Reisman | |

(56) References Cited

U.S. PATENT DOCUMENTS

| | | |
|---|---|---|
| 8,078,450 B2 | 12/2011 | Anisimovich et al. |
| 8,135,575 B1 | 3/2012 | Dean |
| 8,185,830 B2 | 5/2012 | Saha et al. |
| 8,195,447 B2 | 6/2012 | Anismovich |
| 8,214,196 B2 | 7/2012 | Yamada |
| 8,229,977 B1 * | 7/2012 | Anderson ............... G06F 8/38 717/124 |
| 8,239,186 B2 | 8/2012 | Chin |
| 8,239,207 B2 | 8/2012 | Seligman |
| 8,260,846 B2 | 9/2012 | Lahav |
| 8,286,185 B2 | 10/2012 | Ellis et al. |
| 8,296,127 B2 | 10/2012 | Marcu |
| 8,296,463 B2 | 10/2012 | Cheng et al. |
| 8,346,585 B1 | 1/2013 | Griffith et al. |
| 8,352,244 B2 | 1/2013 | Gao et al. |
| 8,364,463 B2 | 1/2013 | Miyamoto |
| 8,386,234 B2 | 2/2013 | Uchimoto et al. |
| 8,413,045 B2 | 4/2013 | Lemonik et al. |
| 8,423,346 B2 | 4/2013 | Seo et al. |
| 8,442,812 B2 | 5/2013 | Ehsani |
| 8,453,052 B1 | 5/2013 | Newman et al. |
| 8,489,980 B2 | 7/2013 | Lakritz |
| 8,521,506 B2 | 8/2013 | Lancaster et al. |
| 8,527,260 B2 | 9/2013 | Best |
| 8,548,794 B2 | 10/2013 | Koehn |
| 8,554,591 B2 | 10/2013 | Reistad et al. |
| 8,594,992 B2 | 11/2013 | Kuhn et al. |
| 8,600,728 B2 | 12/2013 | Knight |
| 8,606,900 B1 | 12/2013 | Levergood et al. |
| 8,612,203 B2 | 12/2013 | Foster |
| 8,615,388 B2 | 12/2013 | Li |
| 8,635,327 B1 | 1/2014 | Levergood et al. |
| 8,635,539 B2 | 1/2014 | Young |
| 8,666,725 B2 | 3/2014 | Och |
| 8,671,214 B2 | 3/2014 | Lockhart et al. |
| 8,676,804 B1 | 3/2014 | Janos et al. |
| 8,683,329 B2 | 3/2014 | Tang et al. |
| 8,688,454 B2 | 4/2014 | Zheng |
| 8,725,496 B2 | 5/2014 | Zhao |
| 8,725,559 B1 | 5/2014 | Kothari et al. |
| 8,768,686 B2 | 7/2014 | Sarikaya et al. |
| 8,775,154 B2 | 7/2014 | Clinchant |
| 8,799,200 B2 | 8/2014 | Lahav |
| 8,818,790 B2 | 8/2014 | He et al. |
| 8,843,359 B2 | 9/2014 | Lauder |
| 8,862,456 B2 | 10/2014 | Krack et al. |
| 8,898,052 B2 | 11/2014 | Waibel |
| 8,903,707 B2 | 12/2014 | Zhao |
| 8,909,683 B1 | 12/2014 | Ledet |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,954,539 B2 | 2/2015 | Lahav |
| 8,972,268 B2 | 3/2015 | Waibel |
| 9,026,425 B2 | 5/2015 | Nikoulina |
| 9,053,202 B2 | 6/2015 | Viswanadha |
| 9,081,762 B2 | 7/2015 | Wu |
| 9,092,405 B1 | 7/2015 | Hayden |
| 9,141,606 B2 | 9/2015 | Marciano |
| 9,176,952 B2 | 11/2015 | Aikawa |
| 9,183,192 B1 | 11/2015 | Ruby, Jr. |
| 9,183,198 B2 | 11/2015 | Shen et al. |
| 9,201,870 B2 | 12/2015 | Jurach |
| 9,208,144 B1 | 12/2015 | Abdulnasyrov |
| 9,317,622 B1 | 4/2016 | Zuromski et al. |
| 9,336,487 B2 | 5/2016 | Lahav |
| 9,369,489 B2 | 6/2016 | Kato |
| 9,396,184 B2 | 7/2016 | Roy |
| 9,396,436 B2 | 7/2016 | Lahav |
| 9,430,449 B2 | 8/2016 | Leblond et al. |
| 9,465,797 B2 | 10/2016 | Ji |
| 9,471,563 B2 | 10/2016 | Trese |
| 9,471,920 B2 | 10/2016 | Kolkowitz et al. |
| 9,519,640 B2 | 12/2016 | Perez |
| 9,519,682 B1 | 12/2016 | Pujara et al. |
| 9,547,626 B2 | 1/2017 | de Voogd |
| 9,552,355 B2 | 1/2017 | Dymetman |
| 9,596,188 B2 | 3/2017 | Cheng et al. |
| 9,600,473 B2 | 3/2017 | Leydon |
| 9,613,026 B2 | 4/2017 | Hodson |
| 9,773,270 B2 | 9/2017 | Costa et al. |
| 9,781,050 B2 | 10/2017 | Cheng et al. |
| 9,954,794 B2 | 4/2018 | Cheng et al. |
| 10,007,646 B1 | 6/2018 | Colborn et al. |
| 10,025,776 B1 | 7/2018 | Sjoberg et al. |
| 10,061,749 B2 | 8/2018 | Homer et al. |
| 10,452,740 B2 | 10/2019 | Leblond et al. |
| 10,521,492 B2 | 12/2019 | Homer et al. |
| 10,572,928 B2 | 2/2020 | Costa et al. |
| 10,580,015 B2 | 3/2020 | Erasmus et al. |
| 10,614,167 B2 | 4/2020 | Bondarchuk et al. |
| 10,657,540 B2 | 5/2020 | Martchenko et al. |
| 10,678,866 B1 | 6/2020 | Ranganathan et al. |
| 10,990,644 B2 | 4/2021 | Homer et al. |
| 11,044,949 B2 | 6/2021 | Homer et al. |
| 11,080,493 B2 | 8/2021 | Bondarchuk et al. |
| 11,182,455 B2 | 11/2021 | Siddiquee et al. |
| 11,301,874 B2 | 4/2022 | Martchenko et al. |
| 11,308,528 B2 | 4/2022 | Leblond et al. |
| 11,694,215 B2 | 7/2023 | Martchenko et al. |
| 12,026,727 B2 | 7/2024 | Martchenko et al. |
| 2001/0029507 A1 | 10/2001 | Nojima |
| 2002/0007383 A1 | 1/2002 | Yoden et al. |
| 2002/0010590 A1 | 1/2002 | Lee |
| 2002/0023101 A1 | 2/2002 | Kurihara et al. |
| 2002/0046018 A1 | 4/2002 | Marcu |
| 2002/0065848 A1 | 5/2002 | Walker et al. |
| 2002/0083103 A1 | 6/2002 | Ballance |
| 2002/0103698 A1 | 8/2002 | Cantrell |
| 2002/0112013 A1 | 8/2002 | Walsh |
| 2002/0120762 A1 | 8/2002 | Cheng et al. |
| 2002/0124109 A1 | 9/2002 | Brown |
| 2002/0133392 A1 * | 9/2002 | Angel .................... G06Q 30/06 707/E17.116 |
| 2002/0178166 A1 | 11/2002 | Hsia |
| 2002/0178257 A1 | 11/2002 | Cerrato |
| 2002/0193983 A1 | 12/2002 | Tokieda et al. |
| 2003/0009320 A1 | 1/2003 | Furuta |
| 2003/0023757 A1 | 1/2003 | Ishioka et al. |
| 2003/0158953 A1 | 8/2003 | Lal |
| 2003/0163346 A1 | 8/2003 | Tinti et al. |
| 2003/0200094 A1 | 10/2003 | Gupta |
| 2004/0010496 A1 | 1/2004 | Behrendt et al. |
| 2004/0015408 A1 * | 1/2004 | Rauen, IV ............ G06Q 10/10 705/26.81 |
| 2004/0015723 A1 | 1/2004 | Pham et al. |
| 2004/0019849 A1 | 1/2004 | Weng et al. |
| 2004/0024739 A1 * | 2/2004 | Copperman .......... G06F 16/367 707/E17.084 |
| 2004/0034520 A1 | 2/2004 | Langkilde-Geary |
| 2004/0039593 A1 | 2/2004 | Eskandari |
| 2004/0044517 A1 | 3/2004 | Palmquist |
| 2004/0044576 A1 | 3/2004 | Kurihara et al. |
| 2004/0068435 A1 | 4/2004 | Braunzell |
| 2004/0148318 A1 | 7/2004 | Taylor et al. |
| 2004/0148409 A1 | 7/2004 | Davis et al. |
| 2004/0187090 A1 | 9/2004 | Meacham |
| 2004/0255281 A1 | 12/2004 | Imamura et al. |
| 2005/0039116 A1 | 2/2005 | Slack-Smith |
| 2005/0086105 A1 | 4/2005 | McFadden et al. |
| 2005/0156714 A1 | 7/2005 | McCarthy et al. |
| 2005/0171944 A1 | 8/2005 | Palmquist |
| 2005/0187774 A1 | 8/2005 | Vuong |
| 2005/0189415 A1 | 9/2005 | Fano et al. |
| 2005/0203884 A1 | 9/2005 | Allen et al. |
| 2005/0228865 A1 | 10/2005 | Hirsch |
| 2005/0235351 A1 | 10/2005 | Seltzer et al. |
| 2005/0246283 A1 | 11/2005 | Gwiazda et al. |
| 2006/0031233 A1 * | 2/2006 | Liu .......................... G06F 40/143 |
| 2006/0041558 A1 | 2/2006 | McCauley et al. |
| 2006/0053367 A1 | 3/2006 | Chen et al. |
| 2006/0080257 A1 | 4/2006 | Vaughan et al. |

(56) References Cited

U.S. PATENT DOCUMENTS

| | | |
|---|---|---|
| 2006/0080265 A1 | 4/2006 | Hinds et al. |
| 2006/0080397 A1 | 4/2006 | Chene et al. |
| 2006/0095443 A1 | 5/2006 | Kumar et al. |
| 2006/0095526 A1 | 5/2006 | Levergood et al. |
| 2006/0178918 A1 | 8/2006 | Mikurak |
| 2006/0248442 A1 | 11/2006 | Rosenstein et al. |
| 2006/0282255 A1 | 12/2006 | Lu |
| 2007/0016363 A1 | 1/2007 | Huang et al. |
| 2007/0022003 A1 | 1/2007 | Chao et al. |
| 2007/0033104 A1 | 2/2007 | Collins et al. |
| 2007/0043553 A1 | 2/2007 | Dolan |
| 2007/0047781 A1 | 3/2007 | Hull et al. |
| 2007/0048714 A1 | 3/2007 | Plastina et al. |
| 2007/0083425 A1 | 4/2007 | Cousineau et al. |
| 2007/0112553 A1 | 5/2007 | Jacobson |
| 2007/0118545 A1 | 5/2007 | Chandrasekharan et al. |
| 2007/0192374 A1 | 8/2007 | Abnous et al. |
| 2007/0207785 A1 | 9/2007 | Chatterjee et al. |
| 2007/0208991 A1 | 9/2007 | Rider |
| 2007/0209005 A1 | 9/2007 | Shaver et al. |
| 2007/0209080 A1 | 9/2007 | Ture et al. |
| 2007/0226058 A1 | 9/2007 | Lorenzen et al. |
| 2007/0234213 A1 | 10/2007 | Krikorian et al. |
| 2008/0028300 A1 | 1/2008 | Krieger et al. |
| 2008/0086298 A1 | 4/2008 | Anismovich |
| 2008/0109374 A1 | 5/2008 | Levergood et al. |
| 2008/0120089 A1 | 5/2008 | Schurig |
| 2008/0120090 A1 | 5/2008 | Schurig |
| 2008/0120120 A1 | 5/2008 | Cirulli et al. |
| 2008/0154577 A1 | 6/2008 | Kim |
| 2008/0195664 A1 | 8/2008 | Maharajh et al. |
| 2008/0201344 A1 | 8/2008 | Levergood et al. |
| 2008/0209320 A1 | 8/2008 | Mawhinney et al. |
| 2008/0244053 A1 | 10/2008 | Sampson et al. |
| 2008/0256235 A1 | 10/2008 | Or Sim et al. |
| 2008/0270398 A1 | 10/2008 | Landau et al. |
| 2008/0288240 A1 | 11/2008 | D'Agostini et al. |
| 2008/0316228 A1 | 12/2008 | Seljavaara |
| 2009/0061764 A1 | 3/2009 | Lockhart et al. |
| 2009/0094017 A1 | 4/2009 | Chen et al. |
| 2009/0099931 A1 | 4/2009 | Aaltonen et al. |
| 2009/0138458 A1 | 5/2009 | Wanker |
| 2009/0171780 A1 | 7/2009 | Aldrey et al. |
| 2009/0197580 A1 | 8/2009 | Gupta et al. |
| 2009/0217196 A1 | 8/2009 | Neff et al. |
| 2009/0217352 A1 | 8/2009 | Shen et al. |
| 2009/0222117 A1 | 9/2009 | Kaplan et al. |
| 2009/0234711 A1 | 9/2009 | Ramer et al. |
| 2009/0240539 A1 | 9/2009 | Slawson |
| 2009/0248801 A1 | 10/2009 | Then et al. |
| 2009/0259684 A1 | 10/2009 | Knight et al. |
| 2009/0313005 A1 | 12/2009 | Jaquinta |
| 2009/0313245 A1 | 12/2009 | Weyl et al. |
| 2010/0017704 A1 | 1/2010 | Jaffe et al. |
| 2010/0023338 A1 | 1/2010 | Petronelli et al. |
| 2010/0023475 A1 | 1/2010 | Lahav |
| 2010/0023581 A1 | 1/2010 | Lahav |
| 2010/0057439 A1 | 3/2010 | Ideuchi et al. |
| 2010/0057561 A1 | 3/2010 | Gifford |
| 2010/0070364 A1 | 3/2010 | Dugan |
| 2010/0070843 A1 | 3/2010 | Duym |
| 2010/0070847 A1* | 3/2010 | Hampton .............. G06F 16/958 715/234 |
| 2010/0121630 A1 | 5/2010 | Mende et al. |
| 2010/0153404 A1 | 6/2010 | Ghosh et al. |
| 2010/0179803 A1 | 7/2010 | Sawaf |
| 2010/0211865 A1 | 8/2010 | Fanning et al. |
| 2010/0217783 A1 | 8/2010 | Farver et al. |
| 2010/0233996 A1 | 9/2010 | Herz et al. |
| 2010/0242069 A1 | 9/2010 | Jung et al. |
| 2010/0257457 A1 | 10/2010 | De Goes |
| 2010/0274661 A1 | 10/2010 | Aaltonen et al. |
| 2010/0281008 A1 | 11/2010 | Braunwarth |
| 2010/0305940 A1 | 12/2010 | Dendi et al. |
| 2010/0306402 A1 | 12/2010 | Russell et al. |
| 2010/0312619 A1 | 12/2010 | Ala-Pietila et al. |
| 2011/0004697 A1 | 1/2011 | Tezuka et al. |
| 2011/0010243 A1 | 1/2011 | Wilburn et al. |
| 2011/0022381 A1 | 1/2011 | Gao et al. |
| 2011/0047468 A1 | 2/2011 | Ishizaka |
| 2011/0060998 A1 | 3/2011 | Schwartz et al. |
| 2011/0066469 A1 | 3/2011 | Kadosh |
| 2011/0078626 A1 | 3/2011 | Bachman et al. |
| 2011/0087540 A1 | 4/2011 | Krishnan et al. |
| 2011/0097693 A1 | 4/2011 | Crawford |
| 2011/0099077 A1 | 4/2011 | Darin et al. |
| 2011/0125783 A1 | 5/2011 | Whale et al. |
| 2011/0161312 A1* | 6/2011 | Wallman .............. G06F 40/134 707/E17.112 |
| 2011/0191458 A1 | 8/2011 | Cheng et al. |
| 2011/0264519 A1 | 10/2011 | Chan et al. |
| 2011/0264736 A1 | 10/2011 | Zuckerberg et al. |
| 2011/0270975 A1 | 11/2011 | Troup |
| 2011/0313754 A1 | 12/2011 | Bastide et al. |
| 2011/0320395 A1 | 12/2011 | Dada et al. |
| 2012/0016655 A1 | 1/2012 | Travieso et al. |
| 2012/0022852 A1 | 1/2012 | Tregaskis |
| 2012/0023129 A1 | 1/2012 | Vedula et al. |
| 2012/0042006 A1 | 2/2012 | Kiley et al. |
| 2012/0096366 A1 | 4/2012 | Narla et al. |
| 2012/0131441 A1 | 5/2012 | Jitkoff et al. |
| 2012/0136718 A1 | 5/2012 | Katti |
| 2012/0143816 A1 | 6/2012 | Zhang et al. |
| 2012/0158485 A1 | 6/2012 | Ogawa |
| 2012/0185759 A1 | 7/2012 | Balinsky et al. |
| 2012/0197718 A1 | 8/2012 | Martchenko et al. |
| 2012/0197770 A1 | 8/2012 | Raheja et al. |
| 2012/0197957 A1 | 8/2012 | de Voogd |
| 2012/0198351 A1 | 8/2012 | Lee et al. |
| 2012/0203861 A1 | 8/2012 | Flack et al. |
| 2012/0216108 A1 | 8/2012 | Yambal et al. |
| 2012/0221319 A1 | 8/2012 | Trese |
| 2012/0221407 A1 | 8/2012 | Erasmus et al. |
| 2012/0226818 A1 | 9/2012 | Atas et al. |
| 2012/0233665 A1 | 9/2012 | Ranganathan et al. |
| 2012/0266076 A1 | 10/2012 | Lockhart et al. |
| 2012/0330644 A1 | 12/2012 | Giraudy et al. |
| 2012/0330990 A1 | 12/2012 | Chen et al. |
| 2013/0031470 A1 | 1/2013 | Daly, Jr. et al. |
| 2013/0036202 A1 | 2/2013 | Lahav |
| 2013/0054404 A1 | 2/2013 | Garcia |
| 2013/0067055 A1 | 3/2013 | Cheng et al. |
| 2013/0091014 A1 | 4/2013 | Kellogg |
| 2013/0097488 A1 | 4/2013 | Coman et al. |
| 2013/0124185 A1 | 5/2013 | Sarr et al. |
| 2013/0124987 A1 | 5/2013 | Lakritz |
| 2013/0144566 A1 | 6/2013 | De Biswas |
| 2013/0151940 A1 | 6/2013 | Bailor et al. |
| 2013/0173247 A1 | 7/2013 | Hodson |
| 2013/0238392 A1 | 9/2013 | Sloan et al. |
| 2013/0262986 A1 | 10/2013 | Leblond et al. |
| 2013/0282859 A1 | 10/2013 | McDonald |
| 2013/0304607 A1 | 11/2013 | Costa et al. |
| 2013/0325442 A1 | 12/2013 | Dahlmeier |
| 2013/0326345 A1 | 12/2013 | Haggart et al. |
| 2014/0019625 A1 | 1/2014 | Cheng et al. |
| 2014/0058718 A1 | 2/2014 | Kunchukuttan |
| 2014/0081775 A1 | 3/2014 | Leblond et al. |
| 2014/0082032 A1 | 3/2014 | Leblond et al. |
| 2014/0087760 A1 | 3/2014 | Bennett |
| 2014/0114864 A1 | 4/2014 | Babich et al. |
| 2014/0142917 A1 | 5/2014 | D'Penha |
| 2014/0142918 A1 | 5/2014 | Dotterer |
| 2014/0173414 A1 | 6/2014 | Chan et al. |
| 2014/0181013 A1 | 6/2014 | Micucci et al. |
| 2014/0188993 A1 | 7/2014 | Klein et al. |
| 2014/0229257 A1 | 8/2014 | Reistad et al. |
| 2014/0236942 A1 | 8/2014 | Li |
| 2014/0250369 A1 | 9/2014 | Mitnick et al. |
| 2014/0278342 A1 | 9/2014 | Shoshan et al. |
| 2014/0282977 A1 | 9/2014 | Madhu et al. |
| 2014/0297252 A1 | 10/2014 | Prasad et al. |
| 2014/0297759 A1 | 10/2014 | Mody |
| 2014/0298483 A1 | 10/2014 | Kato |

(56) References Cited

U.S. PATENT DOCUMENTS

| | | |
|---|---|---|
| 2014/0303956 A1 | 10/2014 | Wilson |
| 2014/0304080 A1 | 10/2014 | Mlmaz |
| 2014/0310229 A1 | 10/2014 | Lahav |
| 2014/0351053 A1 | 11/2014 | Link, II |
| 2014/0358519 A1 | 12/2014 | Mirkin |
| 2014/0358524 A1 | 12/2014 | Papula |
| 2014/0365201 A1 | 12/2014 | Gao |
| 2015/0040000 A1 | 2/2015 | Rice et al. |
| 2015/0051896 A1 | 2/2015 | Simard |
| 2015/0052424 A1 | 2/2015 | Sikchi et al. |
| 2015/0074518 A1 | 3/2015 | Rumsey et al. |
| 2015/0106390 A1 | 4/2015 | Fuchs |
| 2015/0127660 A1 | 5/2015 | Zilberberg et al. |
| 2015/0149455 A1 | 5/2015 | Whitley, Jr. |
| 2015/0149885 A1 | 5/2015 | Homer et al. |
| 2015/0149886 A1 | 5/2015 | Homer et al. |
| 2015/0186362 A1 | 7/2015 | Li |
| 2015/0188961 A1 | 7/2015 | Ricci |
| 2015/0213259 A1 | 7/2015 | Du et al. |
| 2015/0213363 A1 | 7/2015 | Lahav |
| 2015/0248484 A1 | 9/2015 | Yu et al. |
| 2015/0254732 A1 | 9/2015 | Snyder |
| 2015/0310504 A1 | 10/2015 | Potter |
| 2016/0014088 A1 | 1/2016 | Maekawa |
| 2016/0019546 A1 | 1/2016 | Eisen |
| 2016/0057195 A1* | 2/2016 | Jaskiewicz ............ H04L 65/762 709/218 |
| 2016/0103835 A1* | 4/2016 | Zupancic .......... G06F 16/24578 707/749 |
| 2016/0155178 A1* | 6/2016 | Konaiyagarri ...... H04L 67/1001 705/26.61 |
| 2016/0239496 A1 | 8/2016 | Motte et al. |
| 2016/0248785 A1 | 8/2016 | Petry et al. |
| 2016/0275057 A1 | 9/2016 | Dendi et al. |
| 2016/0283952 A1 | 9/2016 | Hall |
| 2016/0371693 A1 | 12/2016 | Kolkowitz et al. |
| 2017/0124069 A1 | 5/2017 | Bondarchuk et al. |
| 2017/0149683 A1 | 5/2017 | Cheng et al. |
| 2017/0235848 A1 | 8/2017 | Van Dusen et al. |
| 2017/0337614 A1 | 11/2017 | Costa et al. |
| 2018/0314674 A1 | 11/2018 | Homer et al. |
| 2019/0065514 A1 | 2/2019 | Siddiquee et al. |
| 2019/0158567 A1 | 5/2019 | Siddiquee et al. |
| 2019/0163459 A1* | 5/2019 | Sreenivasa ................ G06F 8/71 |
| 2020/0104343 A1 | 4/2020 | Homer et al. |
| 2020/0151740 A1 | 5/2020 | Martchenko et al. |
| 2020/0167529 A1 | 5/2020 | Bondarchuk et al. |
| 2022/0101343 A1 | 3/2022 | Martchenko et al. |
| 2023/0259956 A1 | 8/2023 | Martchenko et al. |
| 2024/0311850 A1 | 9/2024 | Martchenko et al. |

FOREIGN PATENT DOCUMENTS

| | | | |
|---|---|---|---|
| AU | 5202299 | A | 10/1999 |
| CA | 2221506 | A1 | 12/1996 |
| CN | 102193914 | A | 9/2011 |
| CN | 102662935 | A | 9/2012 |
| CN | 102902667 | A | 1/2013 |
| DE | 69525374 | T2 | 8/2002 |
| DE | 69431306 | T2 | 5/2003 |
| DE | 69633564 | T2 | 11/2005 |
| EP | 0830774 | A2 | 3/1998 |
| EP | 1128301 | A2 | 8/2001 |
| EP | 1128302 | A2 | 8/2001 |
| EP | 1128303 | A2 | 8/2001 |
| EP | 1170680 | A2 | 1/2002 |
| EP | 0803103 | A1 | 2/2002 |
| EP | 1235177 | A2 | 8/2002 |
| EP | 0734556 | B1 | 9/2002 |
| EP | 0830774 | B1 | 10/2004 |
| EP | 1489523 | A2 | 12/2004 |
| EP | 2299369 | A1 | 3/2011 |
| EP | 2668599 | A1 | 12/2013 |
| EP | 2668626 | A1 | 12/2013 |
| EP | 2678814 | A1 | 1/2014 |
| EP | 2896007 | A1 | 7/2015 |
| EP | 2896008 | A1 | 7/2015 |
| EP | 2896007 | B1 | 7/2020 |
| GB | 2241359 | A | 8/1991 |
| JP | H10509543 | A | 9/1998 |
| JP | H11507752 | A | 7/1999 |
| JP | 2001117847 | A | 4/2001 |
| JP | 2001136583 | A | 5/2001 |
| JP | 3190881 | B2 | 7/2001 |
| JP | 3190882 | B2 | 7/2001 |
| JP | 2001188992 | A | 7/2001 |
| JP | 2001350790 | A | 12/2001 |
| JP | 3260693 | B2 | 2/2002 |
| JP | 2002073677 | A | 3/2002 |
| JP | 2002132822 | A | 5/2002 |
| JP | 3367675 | B2 | 1/2003 |
| JP | 2003032660 | A | 1/2003 |
| JP | 2003157402 | A | 5/2003 |
| JP | 2003216608 | A | 7/2003 |
| JP | 2004538542 | A | 12/2004 |
| JP | 2005056080 | A | 3/2005 |
| JP | 2005174120 | A | 6/2005 |
| JP | 2005267535 | A | 9/2005 |
| JP | 3762882 | B2 | 4/2006 |
| JP | 2006216073 | A | 8/2006 |
| JP | 2006260329 | A | 9/2006 |
| JP | 2007042127 | A | 2/2007 |
| JP | 2008027265 | A | 2/2008 |
| JP | 2009020845 | A | 1/2009 |
| JP | 2009518761 | A | 5/2009 |
| JP | 2009538489 | A | 11/2009 |
| JP | 2009301480 | A | 12/2009 |
| JP | 448554882 | B2 | 6/2010 |
| JP | 2010152588 | A | 7/2010 |
| JP | 2011002905 | A | 1/2011 |
| JP | 4669430 | B2 | 4/2011 |
| JP | 466937382 | B2 | 4/2011 |
| JP | 5952307 | B2 | 7/2016 |
| JP | 595231282 | B2 | 7/2016 |
| JP | 6138054 | B2 | 6/2017 |
| WO | WO9516971 | A1 | 6/1995 |
| WO | WO9613013 | A1 | 5/1996 |
| WO | WO9642041 | A2 | 12/1996 |
| WO | WO9715885 | A1 | 5/1997 |
| WO | WO9819224 | A2 | 5/1998 |
| WO | WO9952626 | A1 | 10/1999 |
| WO | WO2002039318 | A1 | 5/2002 |
| WO | WO20030081441 | A1 | 10/2003 |
| WO | WO2004057464 | A2 | 7/2004 |
| WO | WO2007068123 | A1 | 6/2007 |
| WO | WO20070118424 | A1 | 10/2007 |
| WO | WO2010062540 | A1 | 6/2010 |
| WO | WO2010062542 | A1 | 6/2010 |
| WO | WO2012101240 | A1 | 8/2012 |
| WO | WO2012101243 | A1 | 8/2012 |
| WO | WO2012113791 | A1 | 8/2012 |
| WO | WO2013144358 | A2 | 10/2013 |
| WO | WO2013167734 | A1 | 11/2013 |
| WO | WO2014041148 | A1 | 3/2014 |
| WO | WO2014041149 | A1 | 3/2014 |

OTHER PUBLICATIONS

"HTML (Hypertext Markup Language) Definition." Published May 23, 2015 by Sharpened Productions. Accessed Jan. 19, 2021 from https://techterms.com/definition/html (Year: 2015).*

"The GNU Make Manual", Version 3.79, edition 0.55, Apr. 2000, Free Software Foundation, Inc, pp. 1-8, 118, 128.

"Introduction to ClearCase", Rational Software Corporation, Dec. 1999, Rational ClearCase, Release 4.0, pp. i-xiv, 1, 2, 30, 33, 37, 40, 59.

"Administering ClearCase", Rational Software Corporation, Rational ClearCase Release 4.0, 1999, pp. i-xxx, 1-6, 129-162, 255-260, 278, 281, 283, 345-348.

Challenger et al., "A Scalable System for Consistently Caching Dynamic Web Data", INFOCOM '99. Eighteenth Annual Joint

(56) References Cited

OTHER PUBLICATIONS

Conference of the IEEE Computer and Communications Societies. Proceedings. IEEE, Mar. 21-25, 1999, pp. 294-303, vol. 1, 10 pages.
Challenger et al., "A Publishing System for Efficiently Creating Dynamic Web Content", INFOCOM 2000 Nineteenth Annual Joint Conference of the IEEE Computer and Communications Societies. Proceedings. IEEE, Mar. 26-30, 2000, vol. 2, pp. 1-7, 10.
Croll et al., "Content Management—The Users Requirements", International Broadcasting Convention, Conference Publication No. 447, Sep. 12-16, 1997, 4 pages.
Idiom, Inc. "WorldServer 2 White Paper", 2000, 19 pages.
"VerticalNet Selects Uniscape As Globalization Provider to Speed Global Expansion", Market Wire, Jun. 2000, <www.findarticles.com/p/articles/mi_pwwi/is_200006/ai_mark01011558/print> accessed on Oct. 1, 2005, 2 pages.
"Personify Selects Uniscape to Enable Ebusiness Solutions for Global Markets", PRNewsWire and NEWS desk, Aug. 30, 2000, <www.findwealth.com/personify-selects-uniscape-to-enable-180593pr.html> accessed on Oct. 1, 2005, 2 pages.
"Uniscape, Inc. Home Page", Uniscape, Inc., publicly posted Feb. 20, 1999, <web.archive.org/web/19990220195249//http://www.uniscape-inc.com/> accessed on Oct. 1, 2005, 2 pages.
"Uniscape Introduces Pilot Program to Provide Multilingual Website Management Solutions," Business Wire, Feb. 11, 1999, <www.findarticles.com/p/articles/mi_m0EIN/is_1999_Feb_11/11/ai_53852378> accessed on May 9, 2011, 1 page.
"Uniscape Announces New Solution for Automating Management of Software Localization Process," Business Wire, Aug. 17, 1998, <www.findarticles.com/p/articles/ml_m0EIN/is_1998_August_17/al_21090247> accessed on Sep. 30, 2005, 2 pages.
"Cephren Relies on Uniscape During Rapid Global eBusiness Expansion," Market Wire, Oct. 18, 2000, <www.marketwire.com/mw/iwpr?id=18115&cat=te> accessed on Oct. 1, 2005, 2 pages.
Anonymous; "MyYahoo!—RSS Headlines Module—Frequently Asked Questions," Jan. 24, 2007, XP002508567. [retrieved on Dec. 17, 2008], Retrieved from the Internet: <URL:http://web.archive.org/web/20040124175>, 4 pages.
Krishnan, "Unmittelbare Ergenbnisse Noch Schneller: Google Vorschau—Der Google Produkt-Kompass," Nov. 9, 2010, <http://web.archive.org/web/20101109154340/http://google-produkt-kompass.blogspot.com/2010/11/unmittelbare-ergebnisse-nochschneller.html> accessed on Apr. 4, 2012, 2 pages.
"XML Convert," Unidex, Inc., Aug. 4, 2007, <http://www.unidex.com/xflat.htm> accessed on Apr. 5, 2012, 1 page.
"SOAP," Wikipedia, Jan. 22, 2011, <http://en.wikipedia.org/w/index.php?title=SOAP&oldid=409349976> accessed on Apr. 4, 2012, 5 pages.
Mutz et al., "User-Agent Display Attributes," HTTP Working Group, Nov. 26, 1996, 6 pages.
XP007905525, The Technical Aspects Identified in the Present Application (Art. 15 PCT) are considered part of common general knowledge. Due to their notoriety No. documentary evidence is found to be required. Official Journal Nov. 2007, pp. 592-593.
"International Search Report" and "Written Opinion", Patent Cooperation Treaty Application No. PCT/EP2012/051284, Apr. 26, 2012, 8 pages.
"International Search Report" and "Written Opinion", Patent Cooperation Treaty application No. PCT/EP2012/052934, May 15, 2012, 6 pages.
"International Search Report" and "Written Opinion", Patent Cooperation Treaty application No. PCT/EP2012/051291, May 2, 2012, 11 pages.
"International Search Report" and "Written Opinion", Patent Cooperation Treaty application No. PCT/EP2013/056842, Oct. 23, 2013, 8 pages.
"International Search Report" and "Written Opinion", Patent Cooperation Treaty application No. PCT/EP2013/069078, Jan. 8, 2014, 6 pages.
"International Search Report" and "Written Opinion", Patent Cooperation Treaty application No. PCT/EP2013/069077, Jan. 8, 2014, 6 pages.
Colligan et al.; Special Edition Using Microsoft Office FrontPage 2003; 2004; Que Publishing; pp. 50-91 and 323-326.
"Highlight;" Microsoft Computer Dictionary; May 1, 2002; Microsoft Press; p. 320.
"Office Action", European Patent Convention application No. 12707723.8, Jun. 17, 2014, 5 pages.
"Summons to Attend Oral Proceedings", European Patent Convention application No. 12707723.8, Feb. 11, 2015, 7 pages.
"Inheritance (object-oriented programming)", archived Wikipedia on Sep. 4, 2011, http://en.wikipedia.org/w/index.php?title=inheritance_(object-oriented_programming)&oldid=448382925, pp. 1-7.
"Result of Consultation", European Patent Convention application No. 12707723.8, May 28, 2015, 3 pages.
"Office Action", European Patent Convention application No. 12707723.8, Jun. 29, 2015, 30 pages.
"Minutes of Oral Proceeding", European Patent Convention application No. 12707723.8, Jun. 29, 2015, 8 pages.
Preview; Feb. 26, 2011; Dictionary.com; 2 pages.
EDGAR; "Why Do Browsers Display My Site Differently?" Jun. 3, 2009 (updated Nov. 2010); matthewedgar.net; pp. 1-5.
"Office Action", Japanese Patent Application 2013-550887, Jan. 5, 2016, 10 pages [20 pages with translation].
"Office Action", Japanese Patent Application 2013-550888, Dec. 22, 2015, 4 pages [8 pages with translation].
"Office Action", Japanese Patent Application 2013-554869, Feb. 9, 2016, 2 pages [4 pages with translation].
"Notice of Allowance" Japanese Patent Application 2013-550888, May 24, 2016, 3 pages.
"Notice of Allowance", Japanese Patent Application 2013-554869, May 24, 2016, 3 pages.
"Office Action," Japan Patent Application No. 2013-550887, Oct. 4, 2016, 4 pages [8 pages including translation].
"Office Action," European Patent Application No. 12703482.5, Sep. 6, 2016, 4 pages.
"Serialization"; Wikipedia; Nov. 14, 2013; 10 pages; https://web.archive.org/web/20131114152415/http://en.wikipedia.org/wiki/Serialization.
Microsoft, MSDN; "Serialization .NET Framework 4.5"; Jan. 10, 2013; 2 pages; https://web.archive.org/web/20130110102559/http://msdn.microsoft.com/en-us/library/7ay27kt9(v=vs.110).aspx.
"Office Action," European Patent Application No. 12703483.3, Jan. 25, 2017, 7 pages.
"Notice of Allowance," Japan Patent Application No. 2013-550887, Apr. 11, 2017, 3 pages.
Schafer, Ben J. et al., "Recommender Systems in E-Commerce," Proceedings of the 1st ACM conference on Electronic Commerce (EC '99), ACM, New York, NY, 1999, pp. 158-166.
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.
Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.
"Minutes of Oral Proceeding", European Patent Application No. 12703483.3, Jun. 19, 2018, 4 pages.
"Summons to Attend Oral Proceedings," European Patent Application No. 12703482.5, Feb. 14, 2018, 10 pages.
"Office Action," European Patent Application No. 13776975.8, Jun. 4, 2018, 11 pages.

(56) References Cited

OTHER PUBLICATIONS

"Decision to Refuse," European Patent Application No. 12703482. 5, Sep. 17, 2018, 4 pages.
Leblond, Dominique, "Blueprinting of Multimedia Assets", U.S. Appl. No. 13/619,591, filed Sep. 14, 2012, 40 pages.
"Summons to Attend Oral Proceedings," European Patent Application No. 13776975.8, Jul. 2, 2019, 18 pages.
Eckerson, Wayne, "Performance Management Strategies: How to Create and Deploy Effective Metrics," TDWI Best Practices Report, First Quarter (2009), 35 pages.
Padmanabhan et al., "Using Predictive Prefetching to Improve World Wide Web Latency," ACM SIGCOMM Computer Communication Review 26.3, 1996, pp. 22-36.
Hasegawa et al., "Multilingual Disaster Information System: Information Delivery Using Graphic Text for Mobile Phones," Al & Soc 19, 2005, pp. 265-278.
Wikipedia: "XML" [online], [retrieved on Mar. 2, 2020], Retrieved from the Internet: <https://www.wikipedia.com/XML>, 2 pages.
"Notice of Allowance," European Patent Application No. 13776975. 8, Feb. 12, 2020, 7 pages.
"Serialization (C#)", Microsoft, <https://msdn.microsoft.com/en-us/library/mt656716.aspx>, Jan. 2, 2020, 4 pages.
"What are object serialization and deserialization?" Stack Overflow, <http://stackoverflow.com/questions/1360632/object-serialization-anddeserialization>, Sep. 1, 2009, 6 pages,.
"Java Serialization and Deserialization", Studytonight, <http://www.studytonight.com/java/serialization-and-deserialization.php>, 2020, Accessed Oct. 23, 2020, 7 pages.
Upadhyay, Chirantan, "Serialization and Deserialization in ASP. NET with C#", Code Project, <https://www.codeproject.com/kb/cs/seranddeserialization.aspx>, May 27, 2009, 7 pages.
"serialize", PHP, <http://php.net/manual/en/function.serialize.php>, accessed Oct. 23, 2020, 28 pages.
"Interface Serializable", Oracle, <http://docs.oracle.com/javase/7/docs/api/java/io/Serializable.html>, accessed Oct. 23, 2020, 3 pages.
Sakai, Marie et al., "Building DITA-based CMS as integrated documentation environment", The 6th International Conference on Soft Computing and Intelligent Systems, and The 13th International Symposium on Advanced Intelligence Systems, IEEE, 2012, 5 pages.
"Oracle ATG Platform Programming Guide"; Oracle Corporation; retrieved on Jan. 19, 2021 from <URL:https://docs.oracle.com/cd/E35319_01/Platform.10-2/ATGPlatformProgGuide/html/s0101introduction01.html>, 2013, 2 pages.
Christensson, Per. "HTML Definition." Tech Terms. Sharpened Productions, <URL:https://techterms.com/definition/html>, May 23, 2015, 2 pages.
Adomavicius et al., "Context-Aware Recommender Systems", AI Magazine, 2011, 14 pages.
Fausd, Juan, "Website Localization and Multilingual CMS", Globalization Partners International, Mar. 24, 2011 https://www.globalizationpartners.com/2011/03/24/website-localization-and-multilingual-cms/, pages.
Pendo, Joshua, "Best way to translate database driven content", Stack Overflow, Mar. 14, 2012, https://stackoverflow.com/questions/9705287/best-way-to-translate-database-driven-content, 4 pages.
Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.
Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.
Buck, Christian, " Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.
Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.
Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.
Hardmeier et al. "Tree Kernels for Machine Translation Quality Estimation" [W12-3112] Proceedings of the Seventh Workshop on Statistical Machine Translation, Jun. 7, 2012, pp. 109-113. Retrieved from: http://aclanthology.info/volumes/proceedings-of-the-seventh-workshop-onstatistical-machine-translation.
Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.
Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.
Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.
Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.
Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.
Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.
Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.
Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.
"Best Practices—Knowledge Base," Lilt website [online], Mar. 6, 2017 [retrieved on Oct. 19, 2017], Retrieved from the Internet:<https://lilt.com/kb/translators/best-practices>, 2 pages.
"Data Security—Knowledge Base," Lilt website [online], Oct. 14, 2016 [retrieved on Oct. 19, 2017], Retrieved from the Internet:<https://lilt.com/kb/security>, 1 pages.
"Data Security and Confidentiality," Lilt website [online], 2017 [retrieved on Oct. 19, 2017], Retrieved from the Internet: <https://lilt.com/security>, 7 pages.
"Memories—Knowledge Base," Lilt website [online], Jun. 7, 2017 [retrieved on Oct. 19, 2017], Retrieved from the Internet:<https://lilt.com/kb/project-managers/memory>, 4 pages.

(56) References Cited

OTHER PUBLICATIONS

"Memories (API)—Knowledge Base," Lilt website [online], Jun. 2, 2017 [retrieved on Oct. 19, 2017], Retrieved from the Internet:<https://lilt.com/kb/api/memories>. 1 page.
"Quoting—Knowledge Base," Lilt website [online], Jun. 7, 2017 [retrieved on Oct. 19, 2017], Retrieved from the Internet: <https://lilt.com/kb/project-managers/quoting>, 4 pages.
"The Editor—Knowledge Base," Lilt website [online], Aug. 15, 2017 [retrieved on Oct. 19, 2017], Retrieved from the Internet:<https://lilt.com/kb/translators/editor>, 5 pages.
"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.
"What is Lilt—Knowledge Base," Lilt website [online], Dec. 15, 2016 [retrieved on Oct. 19, 2017], Retrieved from the Internet:<https://lilt.com/kb/what-is-lilt>, 1 page.
"Getting Started—Knowledge Base," Lilt website [online], Apr. 11, 2017 [retrieved on Oct. 20, 2017], Retrieved from the Internet:<https://lilt.com/kb/translators/getting-started>, 2 pages.
"The Lexicon—Knowledge Base," Lilt website [online], Jun. 7, 2017 [retrieved on Oct. 20, 2017], Retrieved from the Internet:<https://lilt.com/kb/translators/lexicon>, 4 pages.
"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.
"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.
"Lilt API_ API Reference," Lilt website [online], retrieved on Oct. 20, 2017, Retrieved from the Internet:<https://lilt.com/docs/api>, 53 pages.
"Automatic Translation Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.
"Projects—Knowledge Base, "Lilt website [online], Jun. 7, 2017, retrieved on Oct. 20, 2017, Retrieved from the Internet: <https://lilt.com/kb/project-managers/projects>, 3 pages.
"Getting Started with lilt," Lilt website [online], May 30, 2017, retrieved on Oct. 20, 2017, Retrieved from the Internet: <https://lilt.com/kb/api/lilt-js>, 6 pages.
"Interactive Translation—Knowledge Base," Lilt website [online], Aug. 17, 2017, retrieved on Oct. 20, 2017, Retrieved from the Internet:<https://lilt.com/kb/api/interactive-translation>, 2 pages,.
Hildebrand et al., "Adaptation of the Translation Model for Statistical Machine Translation based on Information Retrieval," EAMT 2005 Conference Proceedings, May 2005, pp. 133-142. Retrieved from https://www.researchgate.net/publication/228634956_Adaptation_of_the_translation_model_for_statisticalmachine_translation_based on_informati on retrieval.
Och et al., "The Alignment Template Approach to Statistical Machine Translation Machine Translation," Computational Linguistics, vol. 30. No. 4, Dec. 1, 2004, pp. 417-442 (39 pages with citations). Retrieved from http://dl.acm.org/citation.cfm?id=1105589.
Sethy et al., "Building Topic Specific Language Models Fromwebdata Using Competitive Models," Interspeech 2005—Eurospeech, 9th European Conference on Speech Communication and Technology, Lisbon, Portugal, Sep. 4-8, 2005, 4 pages. Retrieved from https://www.researchgate.net/publication/221490916_Building_topic_specific_language_models_from_webdata_using_competitive_models.
Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.
Business Wire, "Language Weaver Introduces User-Managed Customization Tool," Oct. 25, 2005, 3 pages. Retrieved from http: ProQuest.
Winiwarter, W., "Learning Transfer Rules for Machine Translation from Parallel Corpora," Journal of Digital Information Management, vol. 6 No. 4, Aug. 2008, pp. 285-293. Retrieved from https://www.researchgate.net/publication/220608987_Learning_Transfer_Rules_for_Machine_Translation_from_Parallel_Corpora.
Potet et al., "Preliminary Experiments on Using Users' Post-Editions to Enhance a SMT System," Proceedings of the European Association for Machine Translation (EAMT), May 2011, pp. 161-168. Retrieved from Retrieved at http://www.mt-archive.info/EAMT-2011-Potet.pdf.
Ortiz-Martinez et al., "An Interactive Machine Translation System with Online Learning" Proceedings of the Acl-HLT 2011 System Demonstrations, Jun. 21, 2011, pp. 68-73. Retrieved from http://www.aclweb.org/anthology/P11-4012.
Lopez-Salcedo et al., "Online Learning of Log-Linear Weights in Interactive Machine Translation," Communications in Computer and Information Science, vol. 328, 2011, pp. 1-10. Retrieved from http://www.casmacat.eu/uploads/Main/iberspeech2.pdf.
Blanchon et al., "A Web Service Enabling Gradable Post-edition of Pre-translations Pro duced by Existing Translation Tools: Practical Use to Provide High quality Translation of an Online Encyclopedia" Jan. 2009, 9 pages. Retrieved from http://www.mt-archive.info/MTS-2009-Blanchon.pdf.
Levenberg et al."Stream-based Translation Models for Statistical Machine Translation" Human Language Technologies: The 2010 Annual Conference of the North American Chapter of the ACL, Dec. 31, 2010, pp. 394-402.
Lagarda et al. "Statistical Post-Editing of a Rule Based Machine Translation System" Proceedings of NAACL HLT 2009: Short Papers, Jun. 2009, pp. 217-220.
Ehara, "Rule Based Machine Translation Combined with Statistical Post Editor for Japanese to English Patent Translation," MT Summit XI, 2007, pp. 13-18.
Bechara et al. "Statistical Post-Editing for a Statistical MT System" Proceedings of the 13th Machine Translation Summit, 2011, pp. 308-315.
"Summons to Attend Oral Proceedings," European Patent Application No. 12703483.3, Nov. 30, 2017, 11 pages.
"Web analytics," Wikipedia [online], Jan. 27, 2001 [retrieved on Sep. 11, 2017], Retrieved from the Internet: <URL: https://en.wikipedia.org/w/index.php?title=Web_analytics&oldid=410384013>, 11 pages.
"Examining Division Preliminary Opinion," European Patent Application No. 12703483.3, Apr. 30, 2018, 9 pages,.
"Decision to Refuse," European Patent Application No. 12703483.3, Jun. 19, 2018, 24 pages.

* cited by examiner

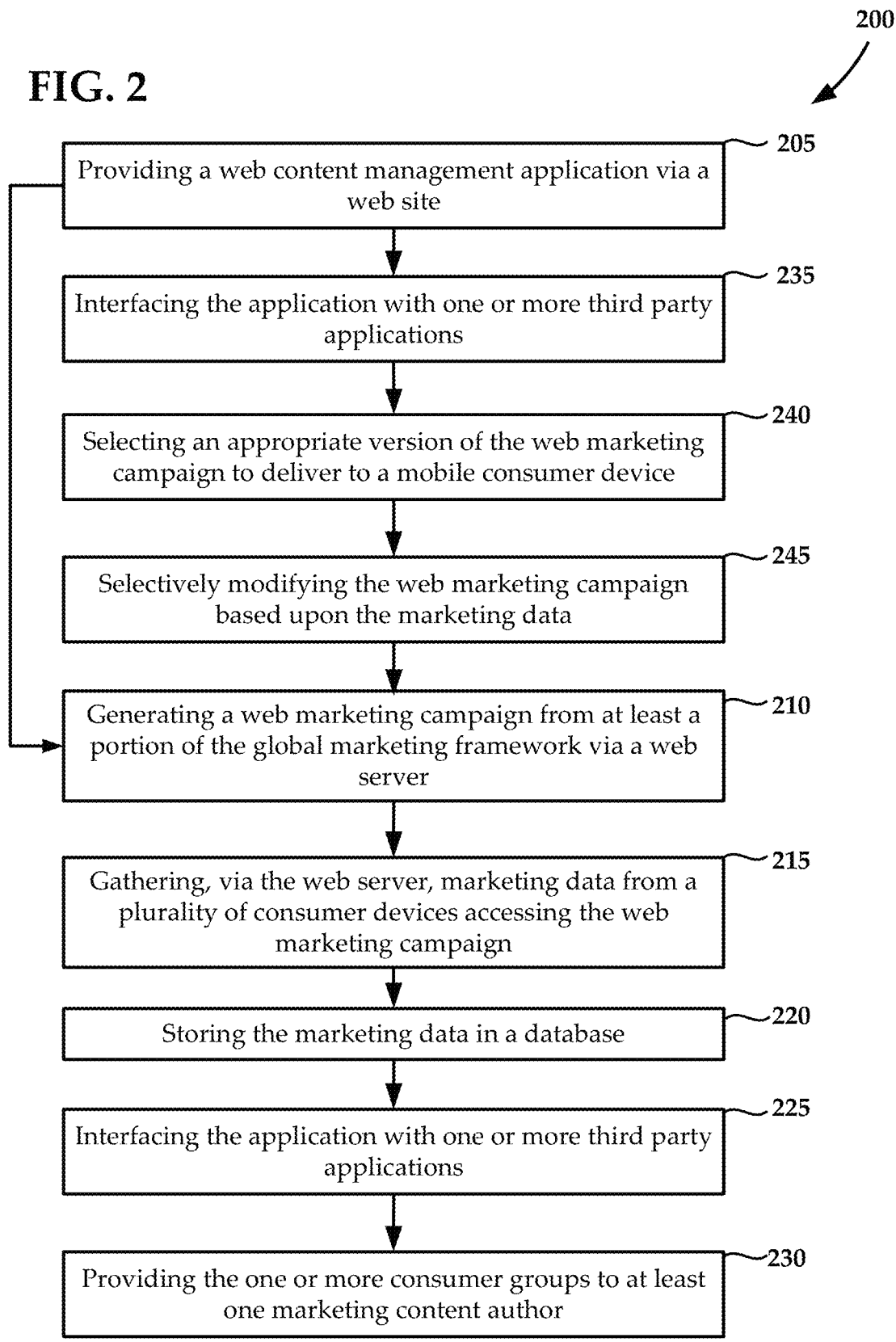

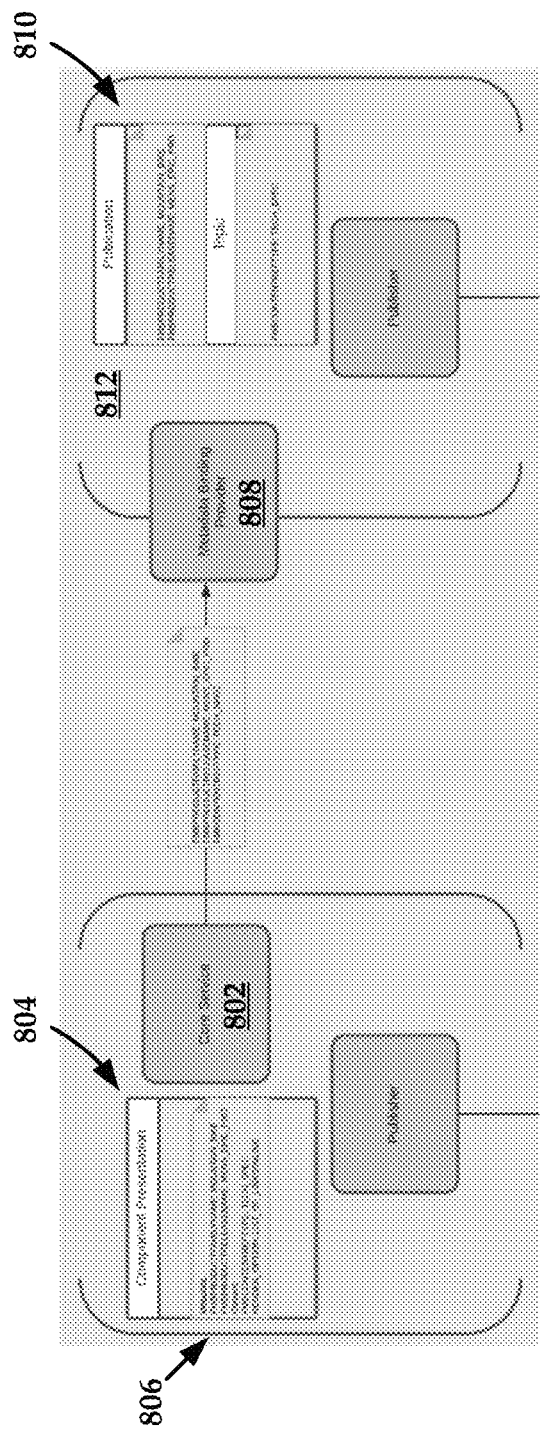
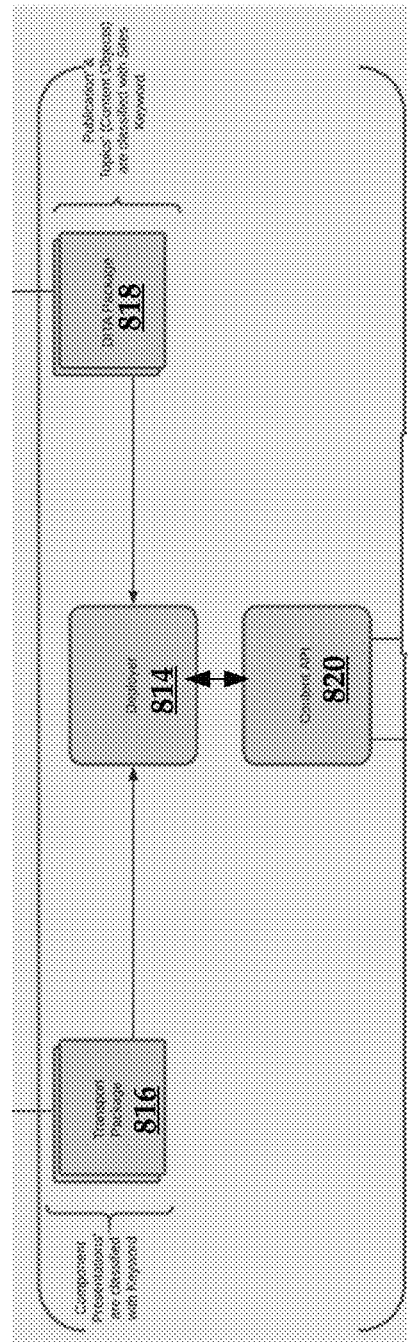
FIG. 8A
FIG. 8B

SYSTEMS AND METHODS FOR MULTI-SYSTEM NETWORKING AND CONTENT DELIVERY USING TAXONOMY SCHEMES

CROSS-REFERENCE TO RELATED APPLICATIONS

This non-provisional patent application is a continuation of U.S. patent application Ser. No. 16/169,901 filed on Oct. 24, 2018, titled "TAXONOMY DRIVEN MULTI-SYSTEM NETWORKING AND CONTENT DELIVERY," which is a continuation-in-part application of U.S. patent application Ser. No. 13/016,989 filed on Jan. 29, 2011, now U.S. Pat. No. 10,657,540 issued on May 19, 2020, titled "SYSTEMS, METHODS, AND MEDIA FOR WEB CONTENT MANAGEMENT," all of which are hereby incorporated herein by reference in their entirety including all references cited therein. This non-provisional patent application is also related to U.S. patent application Ser. No. 13/016,988 filed on Jan. 29, 2011, now U.S. Pat. No. 9,547,626, issued on Jan. 17, 2017, titled "SYSTEMS, METHODS, AND MEDIA FOR MANAGING AMBIENT ADAPTABILITY OF WEB APPLICATIONS AND WEB SERVICES," which is also hereby incorporated herein by reference in its entirety including all references cited therein.

FIELD OF THE INVENTION

The present technology relates generally to web content management, and more specifically, but not by way of limitation, to systems and methods that provide for networking between a plurality of systems using a taxonomy scheme in order to provide a dynamic user experience. In some embodiments these systems and methods leverage artificial intelligence or machine learning to deliver content from the plurality of systems using a taxonomy scheme.

BACKGROUND OF THE INVENTION

Generally speaking, the content of a website may be composed by gathering a mix of content such as textual, image, video, hyperlinks, and applications—just to name a few. These various types of content may be gathered from a variety of sources and from many different third party software tools, such as web design programs. Web content that is created specifically for distribution through web sources, such as a website, may be created in utilizing, for example, a content manager explorer (CME).

Content authors may desire access to information related to the design of web content stored in other systems (e.g., the third party software) that they desire to make use of in the CME. Such an integration of third party software would require specific integrations of the third party software into the main CME and in some cases the core software used by end users to create, manage and publish web content to websites, also known as "CM." Unfortunately, these types of integrations may restrict the number and level of integrations possible.

Moreover, most websites are comprised of a patchwork of functionalities created directly for the website. These functionalities may be included in a web application that is utilized to operate the website. Additionally, the functionalities may be derived from third party sources (internal and external). These third party sources may provide their own code (e.g., tag libraries or application programming interfaces) that must be run in the same environment in which they were created in order for the functionality to be completely rendered by the web application. If the third party sources are not run in the same environment in which they were created, the functionalities may not operate correctly within the web page. One alternative to this requirement is for the CME to allow the use of client side rendering through at least one of hypertext markup language HTML iframe elements and web services through AJAX or JavaScript integrations that may render portions of the web page once the web service data is returned by the web application. Unfortunately, these integration methods may make it difficult to clearly separate web services code from the actual web content. Moreover, web services that utilize, for example, .NET functionalities, may not be able to effectively render third party functionalities from other sources.

SUMMARY

According to some embodiments, the present invention is directed to a system comprising: a website authoring platform generating a taxonomy structure for a webpage, the taxonomy structure indicating assets to be included in the webpage a layout for the assets; a technical documentation authoring system for creating technical documents related to the assets; and a metadata binder providing the technical documentation authoring system with access to the taxonomy structure of the website authoring platform so that technical document authors are provided with the taxonomy structure to guide creation and structuring of the technical documents so that the technical documents comprise data that corresponds to the assets.

According to some embodiments, the present invention is directed to a system comprising: a website authoring platform generating a taxonomy structure for a webpage, the taxonomy structure indicating assets to be included in the webpage a layout for the assets; a technical documentation authoring system for creating technical documents related to the assets, wherein a technical document includes data that is structured and labeled according to the taxonomy structure, the taxonomy structure being received through a metadata binder; and a unified delivery platform system that creates a webpage comprising a content mashup having both the assets and the data from the technical document relating to the asset, the content mashup being created according to the taxonomy structure.

According to some embodiments, the present invention is directed to a method comprising: receiving a taxonomy structure for a webpage, the taxonomy structure defining a layout of content for the webpage, receiving one or more technical documents generated by a technical documentation authoring system related to assets of the webpage, combining, into the webpage, the assets selected by a website authoring platform and data of the one or more technical documents generated by the technical documentation authoring system, according to the layout of the taxonomy structure; and publishing the webpage.

BRIEF DESCRIPTION OF THE DRAWINGS

FIG. 2 is a flow diagram of an exemplary method for managing web content.

FIGS. 8A-8C collectively illustrate an example embodiment of a system that is configured to provide content mashups of the present disclosure in response to real-time navigation data.

DETAILED DESCRIPTION OF EXEMPLARY EMBODIMENTS

Figure 1A:
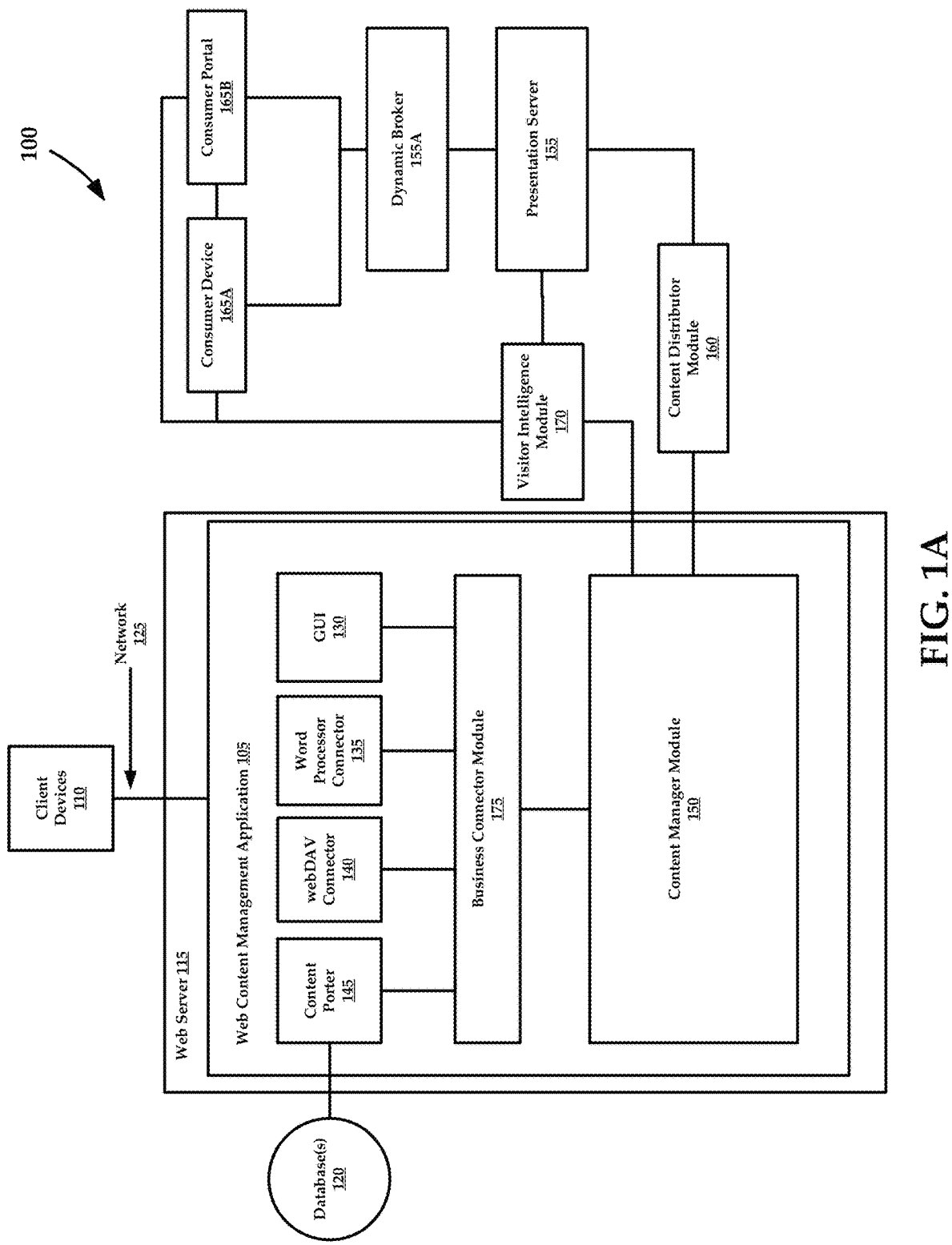
FIG. 1A is a schematic diagram of an exemplary architecture of a system for managing web content that may be utilized to practice aspects of the present technology.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Generally speaking, the systems and methods provided herein may be utilized to generate, manage, and selectively modify web content for global marketing campaigns. The systems and method maintain a global marketing framework that may be utilized to create individual web marketing campaigns across a wide variety of communications mediums. Content authors may utilize the global marketing framework in a collaborative manner and seamlessly incorporate content data created thorough third party applications.

The systems and methods provided herein utilize application data created in a web content management application that provides extra data storage on an item level allowing a content author to store additional web content and external other data (e.g., third party application data) directly into the web content management application. The systems and methods provide mapping between web content associated with a marketing campaign and corresponding data in third party systems, such as product information management systems.

The systems and methods may utilize simple object access protocol web services that are adapted to expose web application data and in some embodiments, affect application data associated with web content as an item transaction. The CME also includes an extensible framework that allows implementers to add extra data obtained through third parties sources/software, as well as associated third party workflow into the web content management application. It will be understood that the term "implementer" may include individuals producing computer readable instructions that may be utilized to modify the appearance or functionalities of the web content management application. These functionalities provide the content authors with one location (the web content management application) at which are able to perform actions with scope over many systems. The combination of these functionalities provides third parties, such as partners, the ability to create portable solutions to integrate third party data from third party data sources. These portable solutions may allow for customization of the web content management application across many installations of the web content management application.

The systems and methods may include a dynamic rendering engine and dynamic rendering engine data format that allows implementers to abstract dynamic functionalities to a predetermined format that is intercepted and rendered by the dynamic rendering engine. Data abstracted to the predetermined format may be utilized as a portion of a core development implementation before being passed back to the requester. According to some embodiments, the core development may include functionalities adapted to render dynamic links that ensure that a website never has broken links to internal pages associated therewith.

It will be understood that the data included in the web content generated by the web content management application is provided according to the predetermined format of the rendering engine, rather than from data format utilized by standard web applications such as JavaScript or .NET. In some embodiments, tag libraries available to the rendering engine data format may be added in Java making it possible to render the functionalities of the web application without actually requiring the deployment of the web application.

Referring now to FIG. 1A, illustrating an exemplary system 100 for managing web content. The system 100 may include a web content management application, hereinafter referred to as the "application 105," adapted to communicate with a plurality of client devices 110. Each of the client devices 110 may be associated with a user (e.g., a content author) who provides content data that may be utilized by the application 105 to generate a global marketing framework. It will be understood that a global marketing framework may include detailed information indicative of a marketing campaign. Portions of the global marketing framework may be utilized to generate customized marketing campaigns that may be deployed across a wide range of communication channels (e.g., web, radio, television, print, and so forth). In some instances, the marketing campaign may include information, such as text, audio, video, forms, templates, user interfaces, and any additional information that may be utilized in the creation of marketing campaigns. Non-limiting examples of marketing campaigns include, banners, links, web pages, and so forth, both interactive and non-interactive.

It is noteworthy that the application 105 may be adapted to generate web marketing campaigns utilizing these customizable and multi-channel functionalities. This may be accomplished, for example, by converting data received by the content authors into widely implemented content structural formats. Such formats may include, for example, an extensible markup language format (XML) that is utilized by the application 105.

The application 105 may be implemented in the context of a web site (FIG. 3) that is hosted on a web server 115. It will be understood that the web server 115 may include a single web server or a plurality of web servers networked or associated together in a cloud configuration (not shown). As will be discussed in greater detail below, the system 100 may include a presentation server 155 adapted to display the web marketing campaign generated by the application 105. A more detailed description of the basic functionalities of client devices 110, web server 115, and presentation server 155 are provided with reference to computing system 400 illustrated in FIG. 4.

In some embodiments, the web server 115 may be operatively associated with one or more databases 120. The one or more databases 120 may be configured as Object Linking and Embedding, Database (OLEDB) or Open Database Connectivity (ODBC) databases. In some embodiments, the content (e.g., global marketing framework, web marketing campaign, etc.) generated by the application 105 may be stored in the one or more databases 120. It will be understood that the client devices 110 may be operatively coupled to the application 105 via a network 125, which in some embodiments includes the Internet.

The content authors may interact with the application 105 via graphical user interfaces (GUIs) 130 generated by the application 105. According to some embodiments, the content authors may interact with the GUIs 130 via a web browser resident on the client device 110. The graphical user interfaces 130 may provide visual representations of the web marketing campaigns generated from the global marketing framework. An exemplary graphical user interface 300 is shown with reference to FIG. 3.

In additional embodiments, content authors may interact with the application 105 via a word processor connector 135 that provides a simplified mechanism for content authors to upload textual information that may be included in the global marketing framework or a web marketing campaign. For example, the word processor connector 135 may be utilized by content authors who need to create simple text for use in a web marketing campaign via any commonly utilized word processing tool. Content authors may open, edit, and create structured (XML) content by uploading a word processing document that is converted by the word processor connector 135 to structured XML content that may be utilized by the application 105. The XML content may then be saved directly to the content manager module 150, which is described in greater detail below.

Content authors may generate web marketing campaigns from the global marketing framework by inheriting portions (or potentially all) of the data of the global marketing framework. The content authors may customize the data for a web marketing campaign based upon a targeted channel of communication. For example, a content author may modify a web marketing campaign targeted to a social networking web site differently from the way the content author modifies the web marketing campaign for use with an e-commerce web site. It will be understood that inheriting may include selecting, extracting, gathering, referencing, and the like.

According to other embodiments, rather than requiring the content authors to create a plurality of individual web marketing campaigns from the global marketing framework, the application 105 may be adapted to automatically and intelligently generate individual marketing campaigns from the global marketing framework. For example, once the global marketing framework has been established, the application 105 may automatically generate web marketing campaigns in a plurality of different languages. Because the plurality of web marketing campaigns inherit their data from the global marketing framework, consistency may be maintained with regard to branding and message content.

Additionally, the application 105 may tailor the content of individual marketing campaigns based upon the desired audience. For example, the application 105 may not only generate an individual marketing campaign for a particular country based upon language utilized in the country, but may also selectively modify the appearance of the individual marketing campaign based upon marketing data gathered for the particular country. For example, if marketing data suggests that different color schemes produce more efficient results for different countries, the various web marketing campaigns may be created with varying color schemes to maximize the efficiency of a web marketing campaign.

While it has been contemplated that the application 105 may tailor individual marketing campaigns for countries, one of ordinary skill in the art will appreciate that individual marketing campaigns may likewise tailored to other targets such as specific consumers, business entities, and states—just to name a few.

In some embodiments, content authors may create folder structures for storing marketing campaign data that may be utilized by the application 105 via a webDAV connector 140. Content authors may add, edit, delete, and use content that is utilized in the generation of web marketing campaigns in the same way that they would use the Windows file system. For example, content authors may access folder structures using a web browser application or any other suitable desktop application resident on the client device 110.

According to some embodiments, the application 105 may include a content porter module 145 adapted to facilitate the exchange of data between the database 120 associated with the web server 115 and at least one of the application 105 and the client devices 110. In other embodiments, the content porter module 145 provides content authors the ability to develop marketing content and/or web site functionalities apart from the live version (e.g., the version currently published on the presentation server 155) of the web site. As stated above, an exemplary visual representation of web site is provided in FIG. 3, and will be described in greater detail below. The application 105 may then transfer the developed marketing content to the application 105, which facilitates the inclusion of the developed content to the live version of the web site.

The content porter module 145 may be adapted to transfer data between different versions or instances of the application 105 running on multiple client devices 110 (e.g., collaborative web marketing campaign creation). The application 105 may be adapted to assemble the portions of the web marketing campaign created by the various content authors into one or more cohesive web marketing campaigns.

Regardless of how the application 105 generates the web marketing campaign(s) (e.g., automatically, via collaborative effort, etc.), the web marketing campaigns may be published to a web site associated with the presentation server 155 via the content distributor module 160. As the web marketing campaigns are published on a presentation server 155, the web marketing campaigns may be accessed via consumer devices 165A or customer portals 165B via a consumer device 165A. It will be understood that the consumer portal 165B may include a web site operated by a marketer or utilized by a marketer to deliver web marketing campaign (e.g., banner advertisement).

Figure 4:
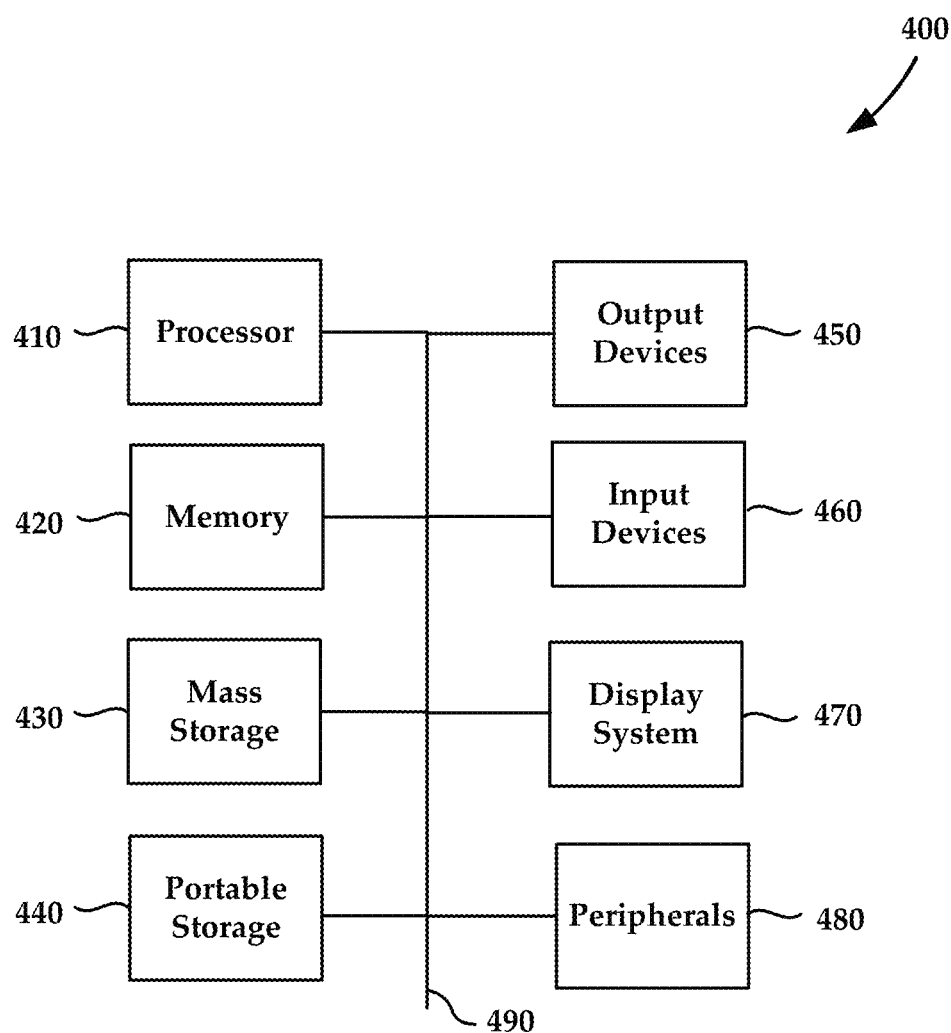
FIG. 4 is a block diagram of an exemplary computing system that may be utilized to practice aspects of the present disclosure.

It will be understood that consumer devices 165A may include computing systems of any kind, and may generally be described with reference to computing system 400 (FIG. 4). It is noteworthy that the presentation server 155 and the web server 115 hosting the application 105 may be combined together.

The system 100 may include a visitor intelligence module 170 adapted to gather, via the presentation server 155, marketing data from the plurality of consumer devices 165A accessing the web marketing campaign. It will be understood that each of the consumer devices 165A may be associated with an individual consumer (i.e., end user) such that an analysis data provided by the consumer devices 165A may yield information indicative of the end user (i.e., consumer) associated therewith. According to some embodiments, the marketing data may include information indicative of the interests of the consumer.

Additionally, the visitor intelligence module 170 may be adapted to analyze information received from the consumers accessing a web marketing campaign via consumer portal 165B.

Generally speaking, the marketing data may include any of a consumer name, a consumer identification, an address, a postal code, a telephone number, a credit card number, a social networking profile, a Internet protocol address, a media access control (MAC) address, visitation duration, visitation frequency, and combinations thereof. One of ordinary skill in the art will appreciate that many other types of information indicative of a consumer may likewise be utilized in accordance with the present invention.

To be sure, any aspects of the present disclosure related to the use of customer or consumer information will be conducted in accordance with relevant and specific data privacy rules and regulations such as GDPR (General Data Protection Regulation) or other similar data privacy regulations that would be known to one of ordinary skill in the art.

In some embodiments, the visitor intelligence module 170 may be adapted to gather marketing data by examining at least one of a cookie, a web form associated with the presentation server hosting the web marketing campaign, a query string embedded in a uniform resource locator (URL) associated with the presentation server hosting the web marketing campaign, window.name information associated with a web browser session, hyper text transfer protocol authentication information, and combinations thereof.

The marketing data gathered by the visitor intelligence module 170 may be stored in a raw format on the database 120 via the content porter module 145. In addition to creating lists of consumers to which marketing campaigns may be directed by utilizing basic raw data such as names, or addresses, the visitor intelligence module 170 may be adapted to create lists based up the one or more consumer groups. For example, a marketing content author, such as an individual creating electronic mail marketing campaigns, may author content that is directed to all consumers that belong to the consumer group of "baseball." Therefore, rather than sending electronic mail marketing campaigns to all consumers identified by the visitor intelligence module 170, directed electronic mail marketing campaigns may be directed to consumers that are known to have an interest in the content of the electronic mail marketing campaign, which in this instance may include a sale on baseball related sports memorabilia.

The content author creates the electronic mail marketing campaign via the application 105 and retrieves the particular consumer groups to which the electronic mail marketing campaign should be directed from the application 105. The application 105 then provides the selected consumer groups to the content author via a business connector module 175.

Figure 1B:
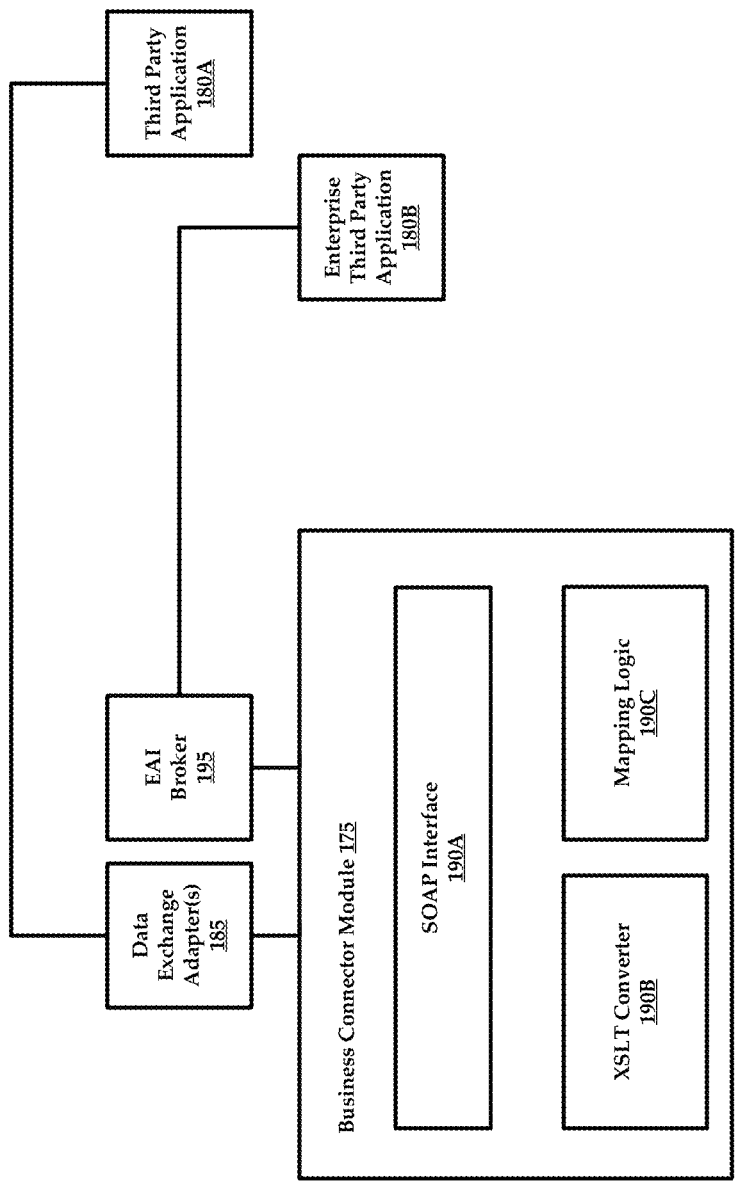
FIG. 1B is a partial schematic diagram of the exemplary architecture of FIG. 1A.

Referring now to FIGS. 1A and 1B collectively, the application 105 may include the business connector module 175 adapted to interface the application 105 with one or more third party application(s) 180A by way of one or more data exchange adapters 185. In addition to data exchange adapters 185, the business connector module 175 may be adapted to communicate directly with third party applications 180A such as Java-based applications.

As stated above, the application 105 may be adapted to utilize a dynamic rendering engine (not shown) and dynamic rendering engine data format that allows implementers to abstract dynamic functionalities (from a third party application 180A) to a predetermined format (that is intercepted and rendered by the dynamic rendering engine). Data abstracted to the predetermined format may be utilized as a portion of a core development implementation before being passed back to the requester.

In some embodiments, the data exchange adapter 185 may be adapted to convert at least one of the marketing data gathered by the visitor intelligence module 170 and the one or more consumer groups created by the visitor intelligence module 170, to the data format utilized by the third party application 180A. For example, the third party application 180A may include applications such as a web page design application, a graphics editing program, and the like that may be utilized to create marketing content that may be incorporated into the web marketing campaign.

The data exchange adapter 185 may interface with webservice enabled third party applications 180A utilizing a simple object access protocol (SOAP) interface 190A, an extensible stylesheet language transformations (XSLT) transformer 190B, and mapping logic module 190C.

In other embodiments, the business connector module 175 may utilize an enterprise application integration broker 195 to exchange data with one or more enterprise third party applications 180B. For example, the enterprise application integration broker 195 may be adapted to facilitate the exchange of data between an enterprise third party application 180B such as an email server application, and the business connector module 175 by determining a data format utilized by the enterprise third party application 180B, which in this case includes simple mail transfer protocol (SMTP) format. In practice, a content author may provide content via an electronic mail message. The data exchange adapter 185 receives the message that is converted by the XSLT transformer 190B to a data format utilized by the application 105, i.e., XML format. The mapping logic module 190C may be adapted to index the data format exchange information established between the SOAP interface 190A and the enterprise third party application 180B. Again, other document formats and service protocols can be used other than XML/SOAP as would be appreciated by one of ordinary skill in the art.

It will be understood that the business connector module 175 may be adapted to provide at least one of the raw marketing data and the one or more consumer groups gathered by the visitor intelligence module 170 to one or more of the third party applications 180A or enterprise third party applications 180B. For example, the data exchange adapter 185 may convert the marketing data gathered by the visitor intelligence module 170 in XML format to a data format that is utilized by a web page design application.

With regard to modifying the content of a web marketing campaign based upon marketing data, the system 100 may include a dynamic broker module 155A associated with the presentation server 155. The dynamic broker module 155A may be adapted to selectively modify a web marketing campaign based upon the marketing data received by the visitor intelligence module 170. For example, the dynamic broker module 155A may modify the web marketing campaign to include different advertisements directed to products from a product catalogue of a marketer based upon the interests of the consumers viewing the web marketing campaign, as determined by the visitor intelligence module 170.

In other embodiments directed to consumers who utilize mobile devices, the dynamic broker module 155A may be adapted to determine a configuration of each mobile consumer device requesting the web marketing campaign. The dynamic broker module 155A may determine the configuration of a mobile consumer device by evaluating the international mobile equipment identifier (IMEI) of the mobile consumer device. By analyzing the IMEI, a mobile device operating system version may be determined, along with other pertinent information. Utilizing the gathered information, the dynamic broker module 155A may cause the provision of a version of the web marking campaign (via the presentation server 155) to the mobile consumer device that may be substantially compatible with the mobile device operating system version of the device.

In other embodiments, the dynamic broker module 155A may be utilized to periodically or continually modify the content of a web marketing campaign based upon an analysis of marketing data. For example, marketing data received from the consumer devices 165A may indicate that a particular web marketing campaign is underperforming (i.e., not generating the proper number of click through instances or generating enough sales). As such, the interests of the consumers accessing the web marketing content may indicate that a change in the products included in the web marketing campaign may more closely coincide with the interests of the consumer groups. Therefore, the application 105 may modify the content of the web marketing campaign to substantially correspond to the interests of the consumers. Moreover, this type of dynamic modification may take place on a granular level (i.e., at the individual consumer level).

FIG. 2 illustrates an exemplary flow chart of a method 200 for managing web content. The method 200 may include the step 205 of providing a web content management application via a web site. The web content management application may be coupled to a web server associated with the web site. Moreover, the web content management application may be adapted to maintain a global marketing framework indicative of a marketing campaign.

Next, the method 200 may include the step 210 of generating a web marketing campaign from at least a portion of the global marketing framework, via the web server, which in some embodiments includes a presentation server. In an additional embodiment, the method 200 may include the step 215 of gathering, via the web server (or the presentation server), marketing data from a plurality of consumer devices accessing the web marketing campaign. It will be understood that each of the consumer devices may be associated with a consumer and that the marketing data may include information indicative of interests of the consumer associated with the consumer device.

Additionally, the method 200 includes the step 220 of storing the marketing data in a database and a step 225 of associating consumers together according to at least one common interest to create one or more consumer groups. The method 200 may also include the step 230 of providing the one or more consumer groups to at least one marketing content author such that the web marketing campaign delivered to the consumer groups may be tailored to the interests of the consumer.

The method 200 may include an additional step 235 of interfacing the application with one or more third party applications via the use of a data exchange adapter or an EAI broker. The method 200 may also include a step 240 of selecting an appropriate version of the web marketing campaign to deliver to a mobile consumer device by evaluating the mobile device information indicative of the mobile consumer device and selecting a version of the web marketing campaign that corresponds to the mobile consumer device. Additionally, the method 200 may include the step 245 of selectively modifying the web marketing campaign based upon the marketing data to increase the efficiency of the marketing campaign.

Figure 3:
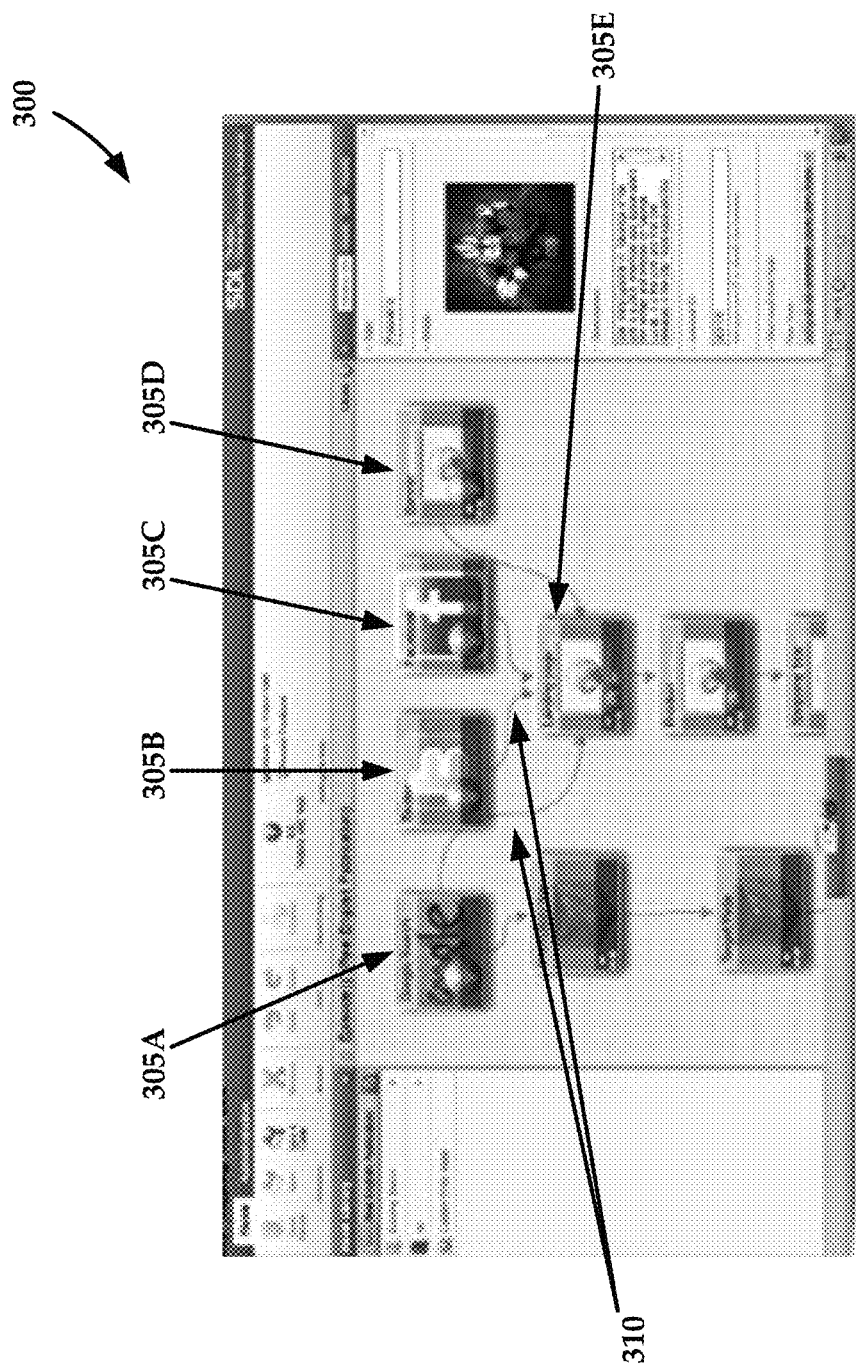
FIG. 3 is an exemplary user interface in the form of a web page for interacting with a web content management application.

FIG. 3 illustrates an exemplary user interface 300 that allows content authors to interact with the application 105. Generally speaking, the user interface 300 generated by the application 105 may provide content authors with a What You See Is What You Get (WYSIWYG) representation of the web marketing campaign. That is, the user interface 300 generated by the application 105 may include a representation of the web marketing campaign that is identical, nearly identical, or to the actual visual appearance of the web marketing campaign that is published by on the presentation server 155. As additional content is added to the web marketing campaign, the user interface is updated to include the new content.

The user interface 300 may include a plurality of block icons 305A-D indicative of individual web marketing campaigns. More particularly, each of the block icons 305A-D may be indicative of a web marketing campaign for a particular communication channel. Block icon 305A includes a web marketing campaign that may be directed to a search engine. Block icon 305B includes a web marketing campaign that may be directed to a first social networking application and block icon 305C to a second social networking application. Additionally, block icon 305D may be directed to a banner advertisement that may be directed to any suitable web site.

The user interface 300 includes visual representations of the relationships of the individual web marketing campaigns relative to one another via directional arrows 310. For example, the directional arrows 310 linking each of the block icons 305A-D may indicate that each of the web marketing campaigns associated with the block icons 305A-D direct consumers to the landing page (represented visually by block icon 305E) of a marketer's website.

As stated previously, the web content management system described above also includes an extensible framework that allows implementers to add extra data obtained through third parties sources/software, as well as associated third party workflow into the web content management application. It will be understood that the term "implementer" may include individuals producing computer readable instructions that may be utilized to modify the appearance or functionalities of the web content management application.

It is noteworthy that some embodiments according to the present technology support a variety of web browsers. Examples include but are not limited to Internet Explorer, Firefox, Chrome, Safari, Opera, various mobile browsers, and so forth. It may be desirable, in certain instances, for a user to be able to extend the graphical user interface (GUI). Advantageously, the system is adapted to allow users (or content authors) to customize the GUI to include features that they commonly use, rather than loading a plurality of features that the user may not need.

In various embodiments, the user possesses the ability specify how the desired add-in features are included in the GUI. For example, a feature such as "rename" may be included in a right-click mouse menu (for example), in an icon included in a toolbar, and so forth. The system may also allow users to change the visual appearance of their GUI, for example, by adding or subtracting columns that provide various types of information. The flexible architecture used for the GUI allows for enhanced extensibility so that users may extend functionality and customizations.

In some embodiments, a centralized model repository is implemented. The inclusion of this centralized model repository may allow for the editors, and the different screens of the editors, to communicate with main model items hosted in a single place. In other words, it is envisioned that when there is a change in a single location in the model repository, the various editors and views may be notified about the change. In exemplary embodiments, when an editor makes a change, the editor makes the change in the centralized model repository. Further, the system may support object models with inheritance of the extended Java script language, thus allowing for the building of object models with inheritance. The inclusion of a configuration framework allows the plug in of new models, editors, and so forth.

FIG. 4 illustrates an exemplary computing system 400 that may be used to implement an embodiment of the present invention. The computing system 400 of FIG. 4 includes one or more processors 410 and main memory 420. Main memory 420 stores, in part, instructions and data for execution by processor 410. Main memory 420 can store the executable code when the computing system 400 is in operation. The computing system 400 of FIG. 4 may further include a mass storage device 430, portable storage medium drive(s) 440, output devices 450, user input devices 460, a display system 470, and other peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 420.

Portable storage device 440 operates in conjunction with a portable non-volatile storage medium, such as a floppy disk, compact disk or digital video disc, to input and output data and code to and from the computing system 400 of FIG. 4. The system software for implementing embodiments of the present invention may be stored on such a portable medium and input to the computing system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the computing system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. Peripheral device(s) 480 may include a modem or a router.

The components contained in the computing system 400 of FIG. 4 are those typically found in computer systems that may be suitable for use with embodiments of the present invention and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Mac OS, Palm OS, and other suitable operating systems.

The computing system 400 may also include a mobile computing device that may have a configuration that includes at least one of a mobile operating system having an operating system version number. Additionally, mobile device may be identified by way of an international mobile equipment identifier (IMEI).

According to some embodiments, the systems and methods of the present disclosure can provide functional access to content through querying and/or access of a plurality of systems. For example, an object such as a product for sale is described by more than one digital document such as a marketing brochure and a technical whitepaper. These documents can often be stored in different repositories or data stores. For example, a network can include a data repository that stores only marketing materials. The network can also include a data repository that stores only technical documents. More often than not, these systems are independent and the authors of these different document types do not communicate or work with one another to generate content. Thus, when the products are advertised, for example, on a webpage, the advertising content may be linked to the webpage or replicated as content on the webpage, but the technical document(s) relating to the products may not be linked to the webpage or readily accessible. To be sure, many customers, and as many as 70% or more, will consider the technical document(s) of a product before consummating a purchase of the product. Thus, webpages that lack multiple content types for a product for sale may lack all the necessary information needed to convert a sale.

A significant technical problem that causes these issues is a lack of cross-referencing between these different document types. For example, authors who create marketing material may be unaware that technical documents for a product exist. Moreover, these individuals lack the means to integrate the technical materials even if they are known. Again, this is often due to the fact that different document types are created and stored in systems that exist and operate orthogonally and/or in a mutually exclusive manner.

The present disclosure provides a technical solution to this type of system and content incompatibility through the creation of a taxonomic-based network structure that allows for combined use of two or more data repositories. This allows content authors to create digital assets such as webpages that are automatically populated with content from many sources by specifying content they desire to incorporate into a webpage. For example, the content authors create a webpage to advertise a service or good. The systems and methods can evaluate the content (attributes of the service or good) included in the webpage and automatically gather links to digital documents that relate to the service or good from many repositories. This automatic content identification and linkage is made possible through the creation and use of a taxonomy structure for each of the data repositories.

In one general example, two systems can be functionally integrated. These example systems include a web content management (WCM) and structured content management (CCMS) with translation technology. The systems of the present disclosure uniquely integrate a webpage authoring system and a product technical document repository. This integration enables the defining of digital experiences on a global scale.

Moreover, these systems and methods enable content publishing for all audiences no matter what location, language or touchpoint, supported by artificial intelligence and machine learning. Both marketing and in-depth product content (e.g., technical content) can be created, managed and delivered cohesively to eliminate the disconnects that characterize digital experiences today and to build brand equity across an entire customer journey.

In some embodiments, the systems and methods herein leverage machine assisted authoring to improve the quality of content by providing guidance, suggesting improvements on style, tone of voice, clarity, grammar, spelling and preferred terminology, while dashboards enable monitoring of overall content quality. This helps keep large, globally dispersed teams of authors, on brand when writing and translating content.

Thus, the systems and methods herein have been developed with both marketing and product development teams in mind. Product developers can benefit from superb content reuse as the CCMS implements a Darwin information typing architecture (DITA) standard and its dynamic publishing features to deliver tailored documentation. This means faster time to ship with better build-integrated documentation, easier content review processes, lower development costs (through automated publishing across multiple platforms and channels), and integrated documentation translation.

In an example use case, if a product and its descriptive content exists the systems and methods herein can dynamically find associated support documents and marketing document, whether co-located or not, using the taxonomy structures disclosed herein. These taxonomy structures are created for each repository and use a standardized format for labeling and categorizing digital document content so that matching content can be linked between repositories. In a basic example, a product name can be standardized and that name can be identified as belonging to documents in multiple data repositories. In some embodiments, this can be accomplished through a taxonomic widget that can be activated during webpage authoring.

Correspondingly, marketers, facing tight deadlines and shorter product release cycles can consistently manage multiple online brands, digital assets and marketing messages with using the WCM system. It gives teams the ability to quickly build and evolve multi-lingual, multi-cultural and multi-brand websites to deliver locally relevant, personal experiences on a global scale to customers' preferred channel and device—all while dramatically shrinking time to market.

Constantly reconfirmed by analysts' market assessments is the ability to handle extreme content volumes and complexity associated with multi-brand, multi-product, multi-site, multi-publication, multilingual environments. The approaches disclosed herein not only create an experience that blends pre-sale, sale and post-sale content into a single customer journey, but also maintains the critical feature richness needed at the authoring level for the various types of content and makes the required sophistication easy to work with.

To keep up with customer demand, companies need to rethink the way they approach the customer journey. Only by unifying experience delivery mechanisms for both marketing content, commerce elements and in-depth product content, can companies truly ensure a joined up digital experience during the entire online customer journey.

Also, in some embodiments, the systems and methods can control webpage or other content authoring using constraining templates or trees. These constraining trees define the types and structure of content that can be placed into a webpage. This guides web content authors by providing them the ability to visualize rules when creating web content. These and other objects of the present disclosure are provided herein with reference to the collective drawings.

Figure 5:
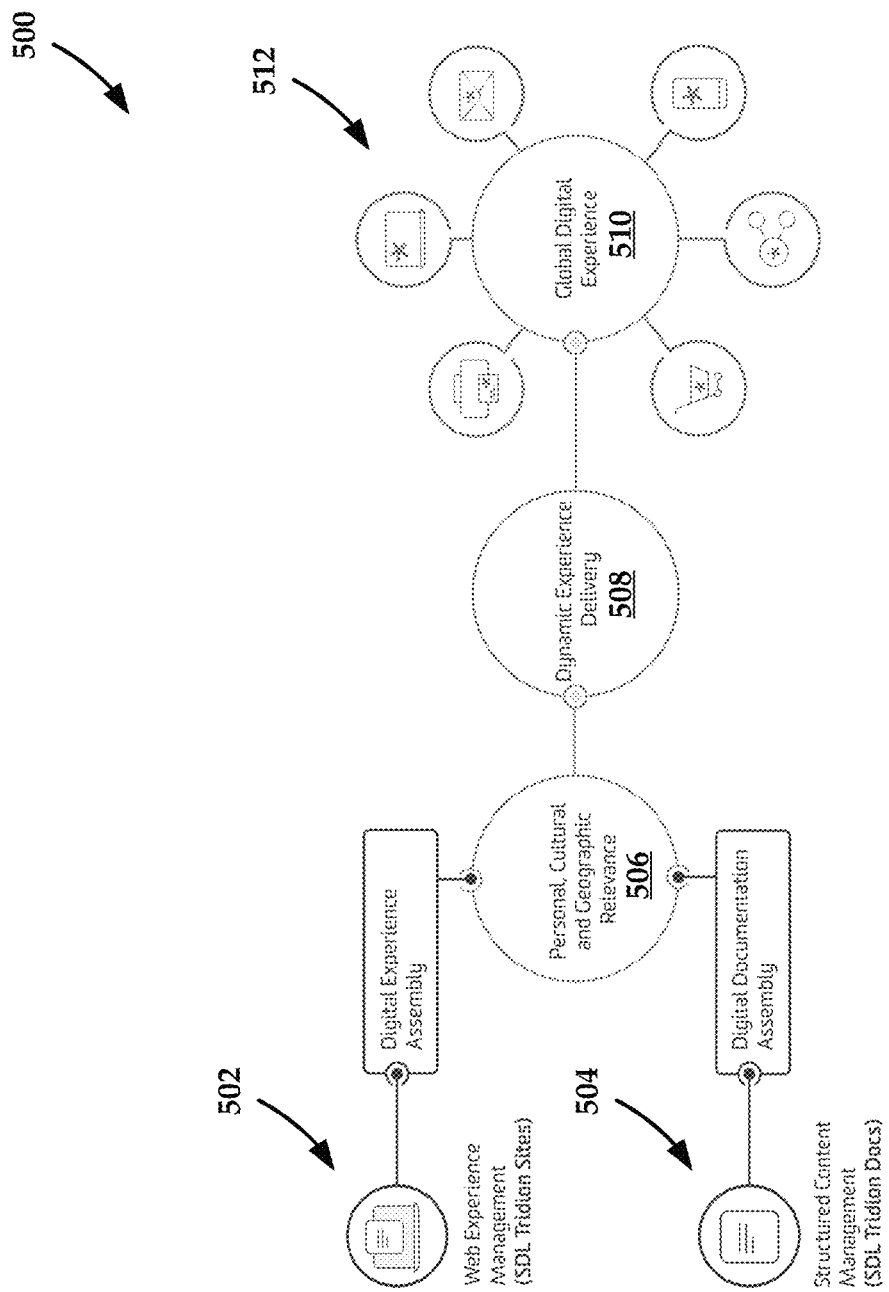
FIG. 5 is a diagrammatic view of an example system for managing and delivering web content that may be utilized to practice aspects of the present technology.

FIG. 5 illustrates an example conceptual diagram of a system of the present disclosure. The system 500 comprises a web content management or web experience management system 502, a structure content management system 504, a contextual relevance process 506, a dynamic experience delivery service 508, and a global distribution management system (also referred to as a global digital experience) 510. In general, the web experience management system 502 can correspond to the system 100 for managing web content disclosed and illustrated above.

Web content generated using the web experience management system 502 and digital documentation (e.g., technical documents) are assembled in the structure content management system 504 before transmission to the contextual relevance process 506. As noted above, the web experience management system 502 is utilized to create multi-site (e.g., end point), multi-brand, and/or multilingual online experiences. The structure content management system 504 is used to generate product and technical documentation various file formats and versions for delivery to different end points.

In the contextual relevance process 506, the content created in both the web experience management system 502 and the structure content management system 504 are tailored using personal, cultural, and/or geographical information. Examples of content tailoring for these parameters are described in greater detail supra, but generally, the authored content from the web experience management system 502 and the structure content management system 504 can be translated from a source language to a target language in the contextual relevance process 506, as well as tailoring for cultural and/or geographic relevance. This tailoring is performed when it is known where the web content and related documentation will be published. For example, web content and/or documentation can be tailored to general or specific preferences of individuals in a country. In some embodiments, the content can be further or additionally tailored for specific individual preferences. In general, tailoring can include any combination of translation, localization, and transcreation of content for the purpose of making web and technical content relevant from a cross-cultural perspective.

In various embodiments, the dynamic experience delivery service 508 creates and leverages the taxonomies of the present disclosure for improving web and technical content. For example, the dynamic experience delivery service 508 can create a taxonomy for content generated by the web experience management system 502 and the structure content management system 504. In one example embodiment, the taxonomy is created using a textual analysis of the web content and the technical documentation. The dynamic experience delivery service 508 can compare the taxonomies created for the respective content of the web experience management system 502 and the structure content management system 504 and link the documents in each of these systems together such that when the web content is delivered the technical documentation is delivered necessarily due to the linking therebetween.

The global distribution management system 510 is used to publish the web content and linked technical documentation to a plurality of end points 512 that can include social networks, computing systems, email mobile devices, and so forth. It will be understood that the global distribution management system 510 can be used to manage and publish content to hundreds, and sometimes thousands of end points.

As noted above, the web experience management system 502 is a distinct system that allows web content creators to author webpages and other similar content. The structure content management system 504 is a system that allows technical document creators to author technical materials such as technical specifications, user manuals, whitepapers, and so forth.

In sum, the system 500 provides a single online dynamic content delivery environment for both web experiences and product led structured content. The system 500 scales to optimize and streamline an entire global content creation and delivery process. The system 500 enables users to create a continuous, consistent brand and content experience across every digital touchpoint in any language. The system 500 is enhanced with artificial intelligence and machine learning to assist authors as they create quality, consistent content more efficiently. The system 500, and specifically the dynamic experience delivery service 508 implements an API-first approach, enabling users to expose content to any site, application or touchpoint, while also providing content authors the benefits of integrated in-context content creation. The system 500 allows authors to extend content delivery options using a RESTful API, providing the option of using dynamic API-based delivery to an ecosystem of mobile applications and websites for full cross-platform publishing and custom user experiences.

Referring briefly to FIGS. 1A-1B and 5 collectively, the business connector module 175 in some embodiments comprises a SOAP based web-service(s). In other embodiments the business connector module 175 comprises an HTTP REST based web-service deployed with respect to the content manager side of the system 100. This service is used for integration during content creation, management, translation, and so forth. Once complete, the content is published the content distributor module 160 (corresponding to the dynamic experience delivery service 508). Embodiments utilizing the dynamic experience delivery service 508 expose the published content using a separate service running in the dynamic experience delivery service 508 (see the unified delivery platform 612 of FIG. 6 as an example).

Figure 6:
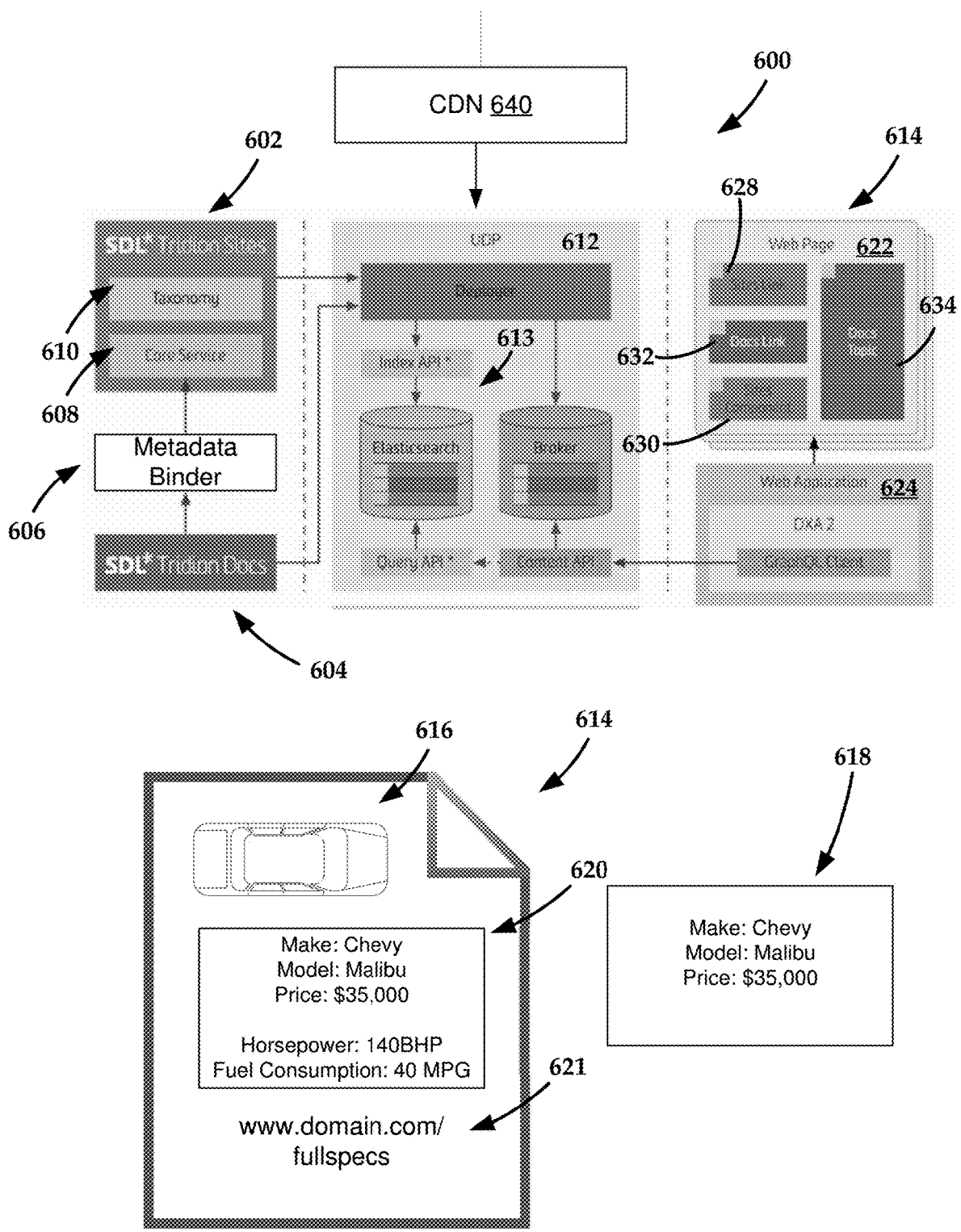
FIG. 6 is a schematic diagram of an example system of the present disclosure as well as an example taxonomic integration between a web experience management system and a structure content management system through use of a metadata binder.

As alluded to above, the features and functions of the content distributor module 160 can be considered in view of the descriptions of the dynamic experience delivery service 508 disclosed herein. That is, in some embodiments, the content distributor module 160 is replaced with the dynamic experience delivery service 508. In some embodiments, such as in the embodiment of FIGS. 8A-8C, content distribution and presentation service are implemented as a web application. FIG. 6 illustrates an example taxonomic integration between a web experience management system 602 and a structure content management system 604 through use of a metadata binder 606. As with the examples disclosed above, the web experience management system comprises a core service 608 that allows for creation of webpages and a taxonomy generator 610 that creates or allows for creation of a taxonomy structure for webpages generated in the web experience management system 602. The taxonomy that is generated is exposed to the structure content management system 604 by the metadata binder 606. That is, the taxonomy created for a webpage by a webpage author is exposed to authors of technical documentation.

In some embodiments, a unified delivery platform (UDP) 612 is utilized to receive independent content published by both the web experience management system 602 and structure content management system 604 and integrate the independently published content using the taxonomy structure generated by the taxonomy generator 610 of the web experience management system 602. In some embodiments, the unified delivery platform 612 can align content from both systems 602 and 604 and using the taxonomy structure. This ensures that content included on a webpage and technical content are properly aligned and integrated into a webpage. In an example webpage 614 being created, content such as an image 616 of a car for sale is placed into a webpage by a webpage author. When the image 616 is placed, the author is provided with an interface that allows the author to fill out taxonomic data about the object in the image. In some instances, the interface is referred to as a taxonomic widget that is activate during webpage authoring.

In some embodiments, the unified delivery platform 612 receives an extensible markup language (XML) document from the web experience management system 602. This can occur during webpage authoring or at runtime when access to a webpage is requested by an end user. The technical documentation is received by the unified delivery platform 612 in a document format that has been structured (or can be read and evaluated) based on the taxonomy structure. The unified delivery platform 612 can create the content mashup between the webpage and the technical documentation using the taxonomy structure.

In some instances, some of the taxonomic data is discovered as metadata that is found in the image 616. If not found, the taxonomic data is provided by the author. The taxonomic data is based on a taxonomy structure. Thus, a taxonomy structure in this example could include category descriptions such as "transportation" and "cars". The taxonomy structure includes keywords such as a model number, maker, and so forth. In sum, the taxonomy structure and its corresponding taxonomic data include both categories and keywords that descriptively define the object, which in this case is a vehicle.

Correspondingly, technical document creators can utilize the taxonomy structure generated by the web experience management system 602 to create and structure technical content so that it corresponds to the taxonomy structure as exposed by the metadata binder 606.

In general, the metadata binder 606 provides the technical documentation authoring system with access to the taxonomy structure of the website authoring platform so that technical document authors are provided with the taxonomy structure to guide creation and structuring of the assets so that the technical documents comprise data that corresponds to the assets. Thus, these authors and systems are now no longer disconnected and creating content that is independent and/or potentially mutually exclusive.

In more detail regarding the creation and use of taxonomies, metadata is stored as part of the content XML of a webpage and can be used to enhance published sites, and drive automation, scheduled publishing and management to the data store. Metadata can be assigned to any object (content, pages, folders, templates, publications etc.) and can be configured directly in a webpage creation interface 622. Using categories and keywords, authors of the webpage can create taxonomies that can be used to by non-technical users to populate metadata fields by selecting pre-configured keywords. Thus, these categories and keywords for classification or metadata become a taxonomy.

Due to the connection between the system 602 and 604 through the metadata binder 606, connections and mashups created between webpages and technical documents produce these taxonomies based on keyword and category. These taxonomies connect the two systems and the metadata binder 606 ensures that when or if taxonomy changes occur in one system they are automatically replicated in the connected system.

On the content delivery or unified delivery platform 612 side, taxonomies can also be used as templates to render content for drill-down, intelligent navigation and more. Authors can nest keywords to define deeper levels of classification and you can add metadata to categories and keywords themselves. In some embodiments, unified delivery platform 612 can also include an indexing service 613 that is used to generate and allow for root queries based on taxonomies and corresponding content.

In some embodiments, a taxonomy tree can be exposed to webpage and/or technical document creators as an aid to build intelligent and dynamic navigation and display content based on user context.

Turning back to the example, the webpage author can utilize a widget 618 of the webpage 614 that provides an interface used to specify asset information according to a taxonomy structure (e.g., defining of categories and keywords). The widget 618 can appear when an asset such as the image 616 is dropped into the webpage 614 during webpage authoring. The webpage author can insert asset information such as a make and model of a car. Using this taxonomy structure to gather data, the unified delivery platform 612 can obtain data from technical documents in the system 604 in order to obtain technical information such as horsepower and fuel consumption. This information is reflected in window 620. Thus, webpage authors can cause the insertion of technical information into the webpage by specifying a minimal amount of data about a given asset. The unified delivery platform 612 completes the webpage by combining or mashing together the asset data and the technical document data regarding the assets. The taxonomy structure defines not only how the assets are described through use of the widget 618, but also a format and content of the window 620 that appears on the webpage 614. Also, in some instances, the taxonomy structure can be used to define a layout of the webpage 614 as well, which will indicate to an author where assets and technical document data should appear. In some embodiments, the layout of the webpage 614 can be determined by use of frameworks or customization features described in the embodiments of FIGS. 1A-3.

Using the taxonomy structure generated for the image 616 from the widget 618, the unified delivery platform 612 can automatically insert technical documents or data from the technical documents into the webpage using the taxonomy structure. This ensures that the webpage creators do not need to understand or have access to the technical documents, but these technical documents nevertheless are inserted into the webpage at runtime. In some embodiments, data is extracted from the technical document using the taxonomy structure and inserted into a window 620 that is a popup relative to the webpage 614. In another embodiment a link or URL 621 to the technical document is provided in lieu of or in addition to the data provided in the window 620.

In one or more embodiments, assets such as images and video can be inserted into the webpage at runtime as well. For example, assets can be stored and delivered from a content delivery network (referred to as CDN 640). Thus, webpage authors can insert assets from the CDN 640 or merely links to the assets that reside on the CDN 640. In some instances the asset is populated into the webpage at runtime by the unified delivery platform 612.

In general taxonomies can be used to classify content of a webpage and technical documents in multiple ways and to define a knowledge map of the content domain. The unified delivery platform 612 environment taxonomies can be used for website navigation and dynamic content assembly. For example, the unified delivery platform 612 stores the taxonomy structures created by the structure content management system 604. When a webpage is requested, the unified delivery platform 612 populates the webpage with the assets required such as images and video or other content as defined in the XML of the webpage, as well as the technical documentation related to the assets. In sum, these content types are populated based on the taxonomy structure for the webpage.

In general, authoring of both webpage and/or technical documents is made available through a client interface 624. A resulting webpage 614 (roughly corresponding to what is shown in the webpage creation interface 622) is created using the integration of FIG. 6 and includes modular components. For example, the webpage 614 includes a content link (sites link 628) and sites component 630 that bring in data from the web experience management system 602, while a docs link 632 and topic 634 include content obtained from the structure content management system 604. The respective content from each system 602 and 604 is arranged using a taxonomy.

As alluded to earlier, the taxonomy can be structured visually as a tree. Each leaf of the tree represents a data type and indicates content that can be pulled from either of the systems 602 and 604. In some embodiments, the taxonomy can be structure can be represented in a webpage layout as well. Thus, taxonomy and its tree structure can be converted into a template that can aid a webpage creator in placing content into the webpage.

Using the example webpage 614 illustrated, the taxonomy tree was used to create the basic layout of the webpage 614 and where content is inserted into the webpage 614. The content areas can be color coded and/or labeled to ensure that web content such as assets like images are placed in their correct location, while linked technical documentation appears in its desired location.

In sum, a taxonomy of the present disclosure allows for component-based webpage creation and management, as well as technical document authoring. These taxonomies act as a model for instructing authors (both webpage and technical) in deciding what content goes on what page. This structured model provides template webpages that have sections arranged according to a structure of a taxonomy. Thus, the taxonomy provides a predefined region schema which reflects a structure (predefined tree) of a webpage. The structure assists a user in putting the proper content in the proper place. The visual depiction guides the user on what types of content are allowed or not based on regional constraints.

Figure 7:
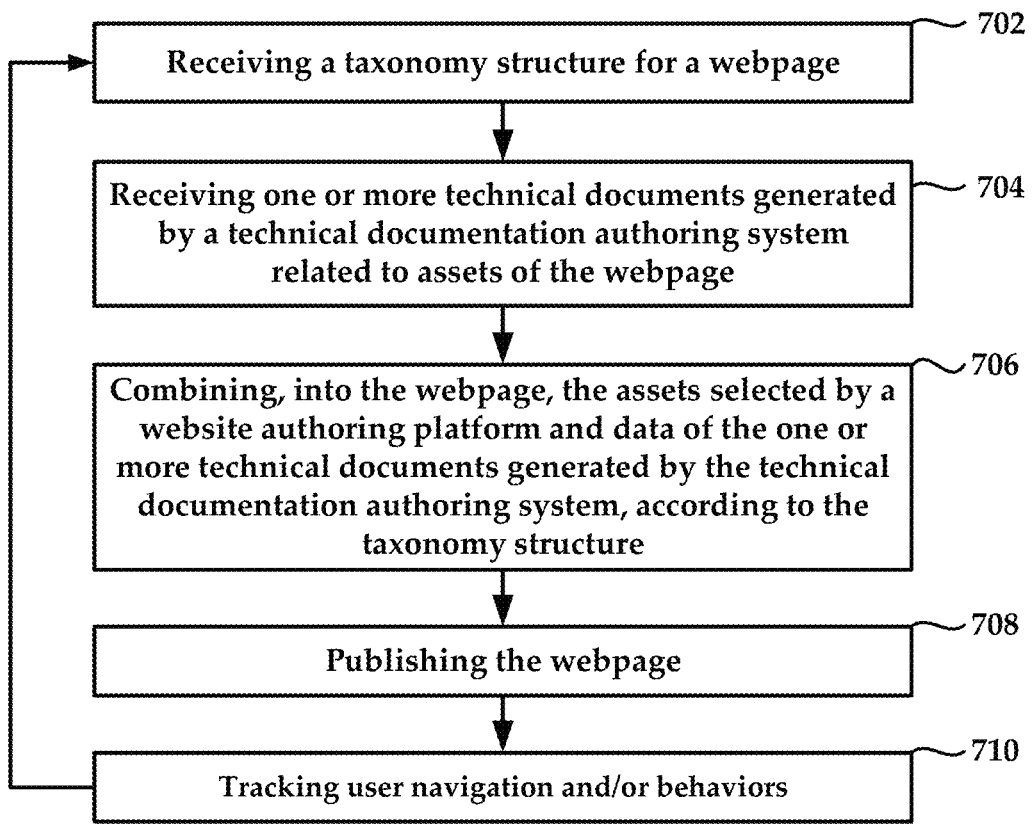
FIG. 7 is a flowchart of an example method of the present disclosure.

FIG. 7 is a flowchart of an example method of the present disclosure that can be executed using, for example, the system 600 of FIG. 6. The method includes a step 702 of receiving a taxonomy structure for a webpage. As noted above, the taxonomy structure defines in general a layout of content for the webpage. The taxonomy also includes categories and keywords that are defined by assets selected for the webpage.

In some embodiments, the method includes a step 704 of receiving one or more technical documents generated by a technical documentation authoring system related to assets of the webpage. Additionally, the method includes a step 706 of combining, into the webpage, the assets selected by a website authoring platform and data of the one or more technical documents generated by the technical documentation authoring system, according to the taxonomy structure. In sum, this process creates a mashup of assets and their corresponding technical document content using the taxonomy structure. In some embodiments, the taxonomy structure is generated by the webpage authors and then subsequently shared with the technical document authors who use this shared taxonomy structure to create technical documents that can be easily searched and used within the webpage.

Once the webpage has been assembled with both assets and data from technical document(s) using the shared taxonomy structure, the method includes a step 708 of publishing the webpage.

In some embodiments, the method includes a step of generating the taxonomy structure for the webpage by a taxonomy generator of the website authoring platform. This step would occur prior to step 702 in some instances.

According to some embodiments, the process of sharing the taxonomy structure involves both pulling of the taxonomy structure from the website authoring platform and providing the taxonomy structure to technical document authors.

In other embodiments, taxonomy generator can create the taxonomy structure and produce a content mashup in a real-time manner. For example, the content pulled from each of the website authoring platform and the structure content system can be in response to real-time user navigation on a website. In an example use case, an end user is navigating on a website published in accordance with the present disclosure. In this example the user is browsing for new vehicles. When the user selects a vehicle to view and subsequently selects to view details regarding the interior features of the vehicle, the publishing server providing the webpage receives the user selections and the dynamic experience delivery service can create a content mashup between images of the vehicle obtained from the website authoring platform and specific technical details from technical documents related to the vehicle, and specifically technical documents related to the interior features of the vehicle. Thus, rather than providing the user with less specific technical documents related to the vehicle, the technical documents provided to the user are provided in accordance with the actual navigation behaviors of the user. In this way, the content mashup provided by the publishing server is based on the taxonomy structure and navigating behaviors of the end user.

Thus, in some embodiments, the method includes a step 710 of tracking user navigation and behaviors. This tracking of user navigation and behaviors can result in republishing the webpage to the user which will include a unique content mashup based on the available website components and technical documents that are germane to the user navigation and/or behaviors.

As noted above, the taxonomy structure comprises at least one category and at least one keyword for each of the assets. In certain embodiments, the assets are defined at least partially by metadata tags that are used by a metadata binder to represent the taxonomy structure to technical documentation authoring system.

Figure 8C:
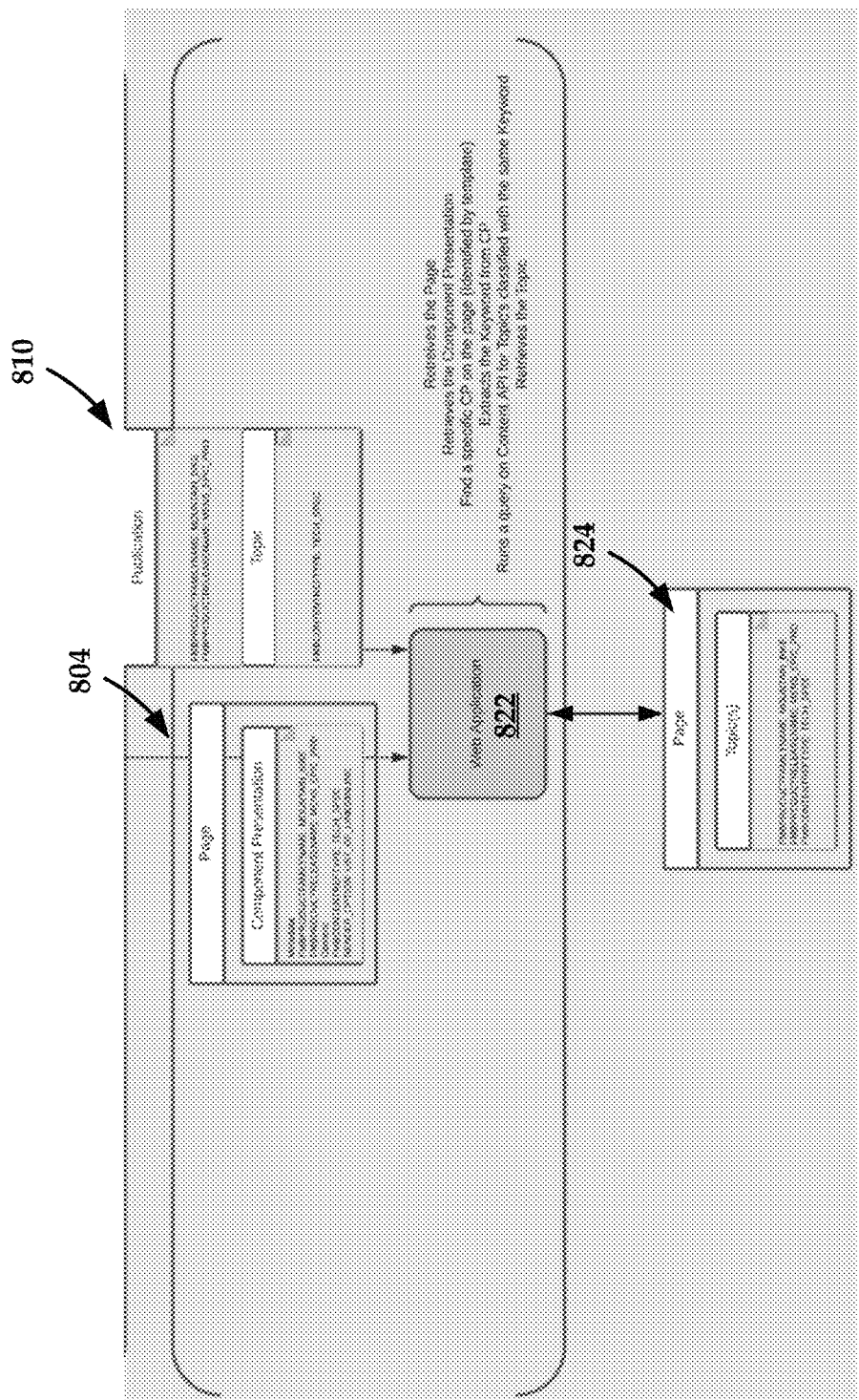

FIGS. 8A-8C collectively illustrate an example diagram that illustrates a real-time capable system of the present disclosure. In general, the system comprises a core service 802, which corresponds to the web experience management system 502 (see FIG. 5) that provides component presentations such as a component presentation 804. The component presentations are indicative of content modules for a webpage. The content of the components is/are represented by metadata 806. The core service 802 can provide the metadata to a metadata binder (e.g., metadata binding provider) 808. The metadata 806 is illustrated as being integrated into a technical publication 810 of a structure content management system 812. Both the core service 802 and the structure content management system 812 comprise a publisher that allows each system/service to publish its content (e.g., publication) to a deployer 814. In some embodiments, the webpage content provided by the core service 802 is represented as a transport package 816. In some embodiments, component presentations are classified with keywords.

Also, the structure content management system 812 produces a DITA (Darwin Information Typing Architecture) package 818. In some embodiments, the DITA package 818 includes keywords that is/are indicative of the technical publication created by the structure content management system 812. A content API 820 couples with the deployer 814 to receive the packages from the core service 802 and the structure content management system 812.

These two content types are combined at a web application 822 and served as a page 824. In one example, the component presentation 804 and the technical publication 810 are combined at the web application 822. The ability to integrate the component presentation 804 and the technical publication 810 is enabled by a taxonomic structure.

Thus, the web application 822 mashes up content for delivery on a page 824 so that the page 824 comprises the component presentation created by the core service 802 and the technical documents of the structure content management system 812. The content obtained from the technical documents in view of the website components is based on a taxonomy structure created from the packages provided to the web application 822.

In this example, the content mashup is created at the web application 822 level. This enables real-time content mashup based on user behaviors. Thus, as a user is interacting with the page 824, the web application 822 provides user behavior data back through the content API 820 to the deployer 814 in order to fine-tune subsequent mashups as noted above.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system RAM.

Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read. The memory can also include solid state drives or equivalents thereof.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system, comprising:
   a dynamic experience delivery service that generates a repository taxonomy structure for each of a plurality of repositories that include assets or technical documents, wherein the assets or the technical documents have formats or types that are incompatible with one another, the repository taxonomy structure for each of the plurality of repositories utilizing a standardized format for labeling and categorizing content so that matching content is linked between the plurality of repositories;
   a website authoring platform having a processor and memory, the processor executing instructions in the memory to generate a website taxonomy structure for a webpage, the website taxonomy structure indicating assets to be included in the webpage, and a layout for the assets, the website taxonomy structure comprising a taxonomy tree that is converted into a visual structure that includes components corresponding to both the assets and data obtained from the technical documents that correspond to the assets as determined by the website taxonomy structure;
   a technical documentation authoring system for creating technical documents related to the assets, the technical documentation authoring system including machine assisted authoring to improve quality of the content by providing guidance, suggested improvements on style, tone of voice, clarity, grammar, spelling and preferred terminology, and includes dashboards monitoring the technical documents' quality;
   a metadata binder providing the technical documentation authoring system with access to the website taxonomy structure of the website authoring platform so that technical document authors are provided with the website taxonomy structure to guide creation and structuring of the technical documents so that the technical documents comprise data that corresponds to the assets, the metadata binder providing automatic replication in a connected system when the website taxonomy structure changes; and
   a web application providing real-time content mashup based on user behavior.

2. The system according to claim 1, wherein the website taxonomy structure comprises at least one category and at least one keyword for each of the assets.

3. The system according to claim 1, further comprising a unified delivery platform system that receives and stores the website taxonomy structure, wherein upon receiving a request for the webpage, the unified delivery platform system assembles the webpage using an extensible markup language (XML) document provided by the website authoring platform.

4. The system according to claim 3, wherein the unified delivery platform system assembles the webpage by populating the assets from a content delivery network and the data obtained from the technical documents that relate to the assets, based on the stored website taxonomy structure for the webpage and each of the repository taxonomy structures for each of the plurality of repositories.

5. The system according to claim 1, wherein the taxonomy structure comprises categories and keywords that are used to integrate or relate independently generated content.

6. The system according to claim 1, wherein leaves of the taxonomy tree each represent a data type and indicate the content to be included from either the technical documentation authoring system or the website authoring platform.

7. A system, comprising:
   a dynamic experience delivery service that generates a repository taxonomy structure for each of a plurality of repositories that include assets or technical documents, wherein the assets or the technical documents have formats or types that are incompatible with one another, the repository taxonomy structure for each of the plurality of repositories utilizing a standardized format for labeling and categorizing content so that matching content is linked between the plurality of repositories;
   a website authoring platform having a processor and memory, the processor executing instructions in the memory to generate a website taxonomy structure for a webpage, the website taxonomy structure indicating the assets to be included in the webpage, and a layout for the assets, the website taxonomy structure comprising a taxonomy tree that is converted into a visual structure that includes components corresponding to both the assets and data obtained from the technical documents that correspond to the assets as determined by the website taxonomy structure;
   a technical documentation authoring system for creating the technical documents related to the assets, the technical documentation authoring system including machine assisted authoring to improve quality of the content by providing guidance, suggested improvements on style, tone of voice, clarity, grammar, spelling and preferred terminology, and includes dashboards monitoring the technical documents' quality, and providing real-time feedback and monitoring document quality parameters, wherein a technical document includes data that is structured and labeled according to the website taxonomy structure, the website taxonomy structure being received through a metadata binder; and
   a unified delivery platform system that creates the webpage comprising a content mashup having both the assets and the data from the technical document relating to an asset, the content mashup being created according to the website taxonomy structure and each of the repository taxonomy structures for each of a plurality of repositories.

8. The system according to claim 7, wherein the website taxonomy structure comprises at least one category and at least one keyword for each of the assets.

9. The system according to claim 8, wherein the unified delivery platform system is further configured to receive and store the website taxonomy structure, wherein upon receiving a request for the webpage, the unified delivery platform system assembles the webpage using an extensible markup language (XML) document provided by the website authoring platform.

10. The system according to claim 9, wherein the unified delivery platform system assembles the webpage by populating the assets from a content delivery network and the data obtained from the technical documents that relate to the assets, based on the website taxonomy structure for the webpage and each of the repository taxonomy structures for each of the plurality of repositories.

11. The system according to claim 7, wherein the website taxonomy structure comprises categories and keywords that are used to integrate or relate independently generated content.

12. The system according to claim 7, wherein leaves of the taxonomy tree each represent a data type and indicate the content to be included from either the technical documentation authoring system or the website authoring platform.

13. A method, comprising:
generating a repository taxonomy structure for each of a plurality of repositories that include assets or technical documents, wherein the assets or the technical documents have formats or types that are incompatible with one another, the repository taxonomy structure for each of the plurality of repositories utilizing a standardized format for labeling and categorizing content so that matching content is linked between the plurality of repositories;
receiving a website taxonomy structure for a webpage, the website taxonomy structure defining a layout of the content for the webpage, the website taxonomy structure indicating the assets to be included in the webpage, and a layout for the assets, the website taxonomy structure comprising a taxonomy tree that is converted into a visual structure that includes components corresponding to both the assets and data obtained from the technical documents that correspond to the assets as determined by the website taxonomy structure;
receiving one or more technical documents generated by a technical documentation authoring system related to the assets of the webpage, the technical documentation authoring system including machine assisted authoring to improve quality of the content by providing guidance, suggested improvements on style, tone of voice, clarity, grammar, spelling and preferred terminology, and including dashboards monitoring the one or more technical documents' quality;
combining, into the webpage, the assets selected by a website authoring platform and the data of the one or more technical documents generated by the technical documentation authoring system, according to the layout of the website taxonomy structure;
publishing the webpage;
tracking user navigation and behaviors to provide website components and the one or more technical documents that are germane to the user navigation or the behaviors;
providing automatic replication of website taxonomy structures in a connected system when website taxonomy structure changes; and
creating and updating content mashups based on the user navigation and the behaviors.

14. The method according to claim 13, further comprising generating the website taxonomy structure for the webpage by a taxonomy generator of the website authoring platform.

15. The method according to claim 14, further comprising:
pulling, by the technical documentation authoring system, the website taxonomy structure from the website authoring platform; and
providing, by the technical documentation authoring system, the website taxonomy structure to technical document authors.

16. The method according to claim 15, wherein the website taxonomy structure comprises at least one category and at least one keyword for each of the assets.

17. The method according to claim 16, wherein the assets are defined at least partially by metadata tags that are used by a metadata binder to represent the website taxonomy structure to the technical documentation authoring system.

18. The method according to claim 13, wherein leaves of the website taxonomy tree each represent a data type and indicate content to be included from either the technical documentation authoring system or the website authoring platform.

19. The method according to claim 13, wherein a unified delivery platform system is further configured to receive and store the website taxonomy structure, and upon receiving a request for the webpage, the unified delivery platform system assembles the webpage using an extensible markup language (XML) document provided by the website authoring platform.

20. The method according to claim 13, wherein the website taxonomy structure is generated by one or more webpage authors and then subsequently shared with one or more technical document authors who use the shared website taxonomy structure to create the technical documents that can be searched and used within the webpage.

* * * * *